US012300108B2

(12) United States Patent
Dennerline

(10) Patent No.: US 12,300,108 B2
(45) Date of Patent: May 13, 2025

(54) DATABASE SYSTEM TO ORGANIZE SELECTABLE ITEMS FOR USERS RELATED TO ROUTE PLANNING

(71) Applicant: Rhett R. Dennerline, Northfield, IL (US)

(72) Inventor: Rhett R. Dennerline, Northfield, IL (US)

(73) Assignee: Navfriend LLC, Versailles, IN (US)

( * ) Notice: Subject to any disclaimer, the term of this patent is extended or adjusted under 35 U.S.C. 154(b) by 0 days.

(21) Appl. No.: 18/387,747

(22) Filed: Nov. 7, 2023

(65) Prior Publication Data

US 2024/0087461 A1   Mar. 14, 2024

Related U.S. Application Data

(63) Continuation of application No. 17/140,066, filed on Jan. 2, 2021, now Pat. No. 11,847,921, which is a (Continued)

(51) Int. Cl.
*G08G 5/00* (2006.01)
*G01C 21/20* (2006.01)
(Continued)

(52) U.S. Cl.
CPC ........... *G08G 5/0034* (2013.01); *G01C 21/20* (2013.01); *G06F 16/21* (2019.01); *G06F 16/23* (2019.01);
(Continued)

(58) Field of Classification Search
CPC ...... G08G 5/003; G08G 5/0013; G08G 5/006; G08G 5/0069; G08G 5/0026;
(Continued)

(56) References Cited

U.S. PATENT DOCUMENTS 4,642,775 A    2/1987   Cline
6,748,316 B2   6/2004   Takayama
(Continued)

OTHER PUBLICATIONS

"Foreflight releases," [online] Foreflight, LLC [downloaded on Jul. 15, 2019] Retrieved from the Internet: <URL: https://www.foreflight.com/releases/>, pp. 1-7.
(Continued)

*Primary Examiner* — Shon G Foley
(74) *Attorney, Agent, or Firm* — Chicago IP Law; Steven M. Evans

(57) ABSTRACT

The present disclosure relates to an electronic system for providing access to a useable, tailored database of selectable items for a user, e.g., user selectable routes entered by pilot users to utilize for flight planning and aircraft route guidance, and other related information from a remote processing center to a local unit over wireless, wire line, or telecommunications network or combination thereof. The disclosure more particularly relates, for example, to an electronic system including one or more remote processing centers and a plurality of local units, e.g., a desktop computer, laptop, tablet, cellular device, or mobile telephone unit, for providing to a pilot's local unit information of other pilot users from one or more databases, in particular, a pilot user's route with FAA identifiers (such as airports, VORs, NDBs, waypoints, reporting points, airways, etc.), waypoints, departure airport, destination airport, hazards, FAA VFR sectional and/or IFR airway map for guidance, pilot comments, and other information which has been calculated and/or stored at one or more remote processing centers in response to a query or selection request received from a local unit operated by an pilot user, for example.

21 Claims, 9 Drawing Sheets

Related U.S. Application Data continuation of application No. 16/693,165, filed on Nov. 22, 2019, now Pat. No. 10,885,794, which is a continuation of application No. 15/417,653, filed on Jan. 27, 2017, now Pat. No. 10,490,087, which is a continuation of application No. 14/518,158, filed on Oct. 20, 2014, now abandoned.

(60) Provisional application No. 61/961,739, filed on Oct. 21, 2013.

(51) Int. Cl.
*G06F 16/21* (2019.01)
*G06F 16/23* (2019.01)

(52) U.S. Cl.
CPC ......... *G08G 5/0013* (2013.01); *G08G 5/0026* (2013.01)

(58) Field of Classification Search
CPC .. G08G 5/0034; G08G 5/0043; G08G 5/0082; B64C 39/024; B64U 10/13; B64U 2201/00; H04B 7/18506
See application file for complete search history.

(56) References Cited

U.S. PATENT DOCUMENTS

| | | | |
|---|---|---|---|
| 7,668,744 | B2 | 2/2010 | Tiourine |
| 7,779,023 | B2 | 8/2010 | Smyth |
| 7,786,899 | B2 | 8/2010 | Baker |
| 8,162,256 | B2 | 4/2012 | Goossen |
| 8,178,825 | B2 | 5/2012 | Goossen |
| 8,185,298 | B2 | 5/2012 | Jha |
| 8,205,820 | B2 | 6/2012 | Goossen |
| 8,214,144 | B2 | 7/2012 | Baker |
| 8,234,068 | B1 | 7/2012 | Young |
| 8,266,547 | B2 | 9/2012 | Daughtrey |
| 8,296,281 | B2 | 10/2012 | Baker |
| 8,328,130 | B2 | 12/2012 | Goossen |
| 8,375,837 | B2 | 2/2013 | Goossen |
| 8,380,366 | B1 | 2/2013 | Schulte |
| 8,447,512 | B2 | 5/2013 | Stenbock |
| 8,521,342 | B2 | 8/2013 | Barnesberger |
| 8,700,236 | B1 | 4/2014 | Berman |
| 9,043,051 | B1 | 5/2015 | Barber |
| 2005/0080794 | A1 | 5/2005 | Ledingham |
| 2006/0031006 | A1 | 2/2006 | Stenbock |
| 2006/0259234 | A1 | 11/2006 | Flynn |
| 2008/0103645 | A1 | 5/2008 | DeMers |
| 2009/0118998 | A1 | 5/2009 | Chau |
| 2009/0150012 | A1 | 6/2009 | Agam |
| 2009/0240699 | A1 | 9/2009 | Morgan |
| 2010/0114408 | A1 | 5/2010 | Goossen |
| 2010/0277347 | A1 | 11/2010 | Judd |
| 2011/0084162 | A1 | 4/2011 | Goossen |
| 2012/0143482 | A1 | 6/2012 | Goossen |
| 2013/0046422 | A1 | 2/2013 | Cabos |
| 2013/0103951 | A1 | 4/2013 | Klevan |
| 2013/0131970 | A1* | 5/2013 | Pendry ............... G08G 5/0039 701/120 |
| 2014/0018976 | A1 | 1/2014 | Goossen |
| 2014/0018979 | A1 | 1/2014 | Goossen |
| 2014/0081569 | A1 | 3/2014 | Agrawal |
| 2014/0166817 | A1 | 6/2014 | Levien |
| 2015/0066342 | A1 | 3/2015 | Garzella |
| 2015/0066634 | A1 | 3/2015 | Armon-Kest |

OTHER PUBLICATIONS

ForeFlight Mobile 5.4.1, Foreflight LLC, Sep. 29, 2013 [downloaded Jul. 13, 2019] Retrieved from the Internet: <URL: https://blog.foreflight.com/2013/09/29/foreflight-mobile-5-4-1>.

Bulletin: IFR enroute chart download fix in ForeFlight Mobile 5.3.3, Foreflight LLC, Aug. 15, 2013 [downloaded on Aug. 13, 2019] Retrieved from the Internet: <URL: https://blog.foreflight.com/2013/08/15/bulletin-ifr-enroute-chart-download-fix-in-foreflight-mobile-5-3-3/>.

ForeFlight Mobile 5.2.2, Foreflight LLC, Jul. 18, 2013 [downloaded on Jul. 13, 2019] Retrieved from the Internet: <URL: https://blog.foreflight.com/2013/07/18/foreflight-mobile-5-2-2/>.

ForeFlight Mobile 5.2.1, Foreflight LLC, Jul. 8, 2013 [downloaded on Jul. 13, 2019] Retrieved from the Internet: <URL: https://blog.foreflight.com/2013/07/08/foreflight-mobile-5-2-1/>.

"Pilot's guide to Foreflight mobile," 22nd edition, covers ForeFlight mobile v5.4 on iPad [online], Foreflight LLC [downloaded on Jul. 13, 2019] Retrieved from the Internet: <URL: http://cloudfront.foreflight.com/docs/ff/5.4b/v5.4—foreflight mobile pilot guide.pdf>, pp. 1-119 (Sent in two parts due to size).

"X plane 10 manual," re ver. 10.11 of manual [downloaded on Mar. 14, 2021] Retrieved from the Internet: <URL: https://cdn.cloudflare.steamstatic.com/steam/apps/292180/manuals/X-Plane_10_manual.pdf?t=1569426514>, Cover, p. i-x, pp. 1-175.

"Garmin G1000 Integrated Flight Deck Pilot's Guide Cessna Nav III" Garmin, 10/11 [downloaded on Mar. 15, 2021] Retrieved from the Internet: <URL: https://static.garmincdn.com/pumac/190-00498-07_0A_Web.pdf>, Cover pages, pp. i-x, pp. 1-610, pp. I-1 to I-6, back pages. (Sent in three parts due to size).

G1000 pilot's training guide instructor's reference, Garmin, 08/05 [downloaded on Mar. 15, 2021] Retrieved from the Internet: <URL: https://static.garmin.com/pumac/G1000: on-AirframeSpecific_PilotsTrainingGuide_InstructorsReference-04_.pdf >, Cover pages, pp. I-IV, pp. 1-46, back pages.

"Avionics: When all else fails An app that helps you glide to safety" Aircraft Owners & Pilots Asso., D. Hirshman, 4/13 [downloaded on Mar. 15, 2021] Retrieved from the Internet: <URL: https://www.aopa.org/news-and-media/all-news/2013/april/01/avionics-when-all-else-fails>, 7 pages.

ICAO, The Convention on International Civil Aviation, Annexes 1 to 18 [booklet] Oct. 12, 2012, [downloaded Feb. 8, 2025] Retrieved from Internet <URL: https://www.icao.int/safety/airnavigation/NationalityMarks/annexes_booklet_en.pdf>, pp. 1-34.

ICAO So. Amer. Regional Office, Fifth Workshop/Meeting Of The SAM Implementation Group (SAM/IG/5) Regional Project RLA/06/901, Lima, Peru, May 10-14, 2010, Agenda Item 3 [downloaded on Feb 8, 2025] Retrieved from the Internet <URL:httpswww.icao.intSAMDocuments2010SAMIG5SAMIG5_IP10_Jeppesen.pdf>, pp. 1-7.

* cited by examiner

| Home | My Logbook | My NavFriends | Share New Route | Search Routes | Popular/Featured Routes | Help |

Alabama   Alaska   Arizona   Arkansas   California   Colorado   Connecticut   Delaware   Florida   Georgia   Hawaii
Idaho   Illinois   Indiana   Iowa   Kansas   Kentucky   Louisiana   Maine   Maryland   Massachusetts   Michigan
Minnesota   Mississippi   Missouri   Montana   Nebraska   Nevada   New Hampshire   New Jersey   New Mexico
New York   North Carolina   North Dakota   Ohio   Oklahoma   Oregon   Pennsylvania   Rhode Island   South Carolina
South Dakota   Tennessee   Texas   Utah   Vermont   Virginia   Washington   West Virginia   Wisconsin   Wyoming
American Samoa   Guam   Northern Mariana Islands   Puerto Rico   U.S. Virgin Islands Welcome to NavFriend, John!

To view topics within a forum, click a plus symbol ( ) next to a topic name (or the topic name itself) in the frame to the left.

Users Today: 124, Current NavFriends logged in: 9
Total Routes     Routes Today
   133810              37

Popular: Today     Month     Last 6 months     Featured

Search Routes by: Departure airport, Destination airport, Tail number, NavFriend pilot, Country, State, Dates Legal Disclaimer All NavFriend -Routes Illinois
- Departure airports (173, 2 New)
  + 10C (27)
  + 3CK (97)
  + KARR (322)
  + KIGQ (233)
  + KIKK (39)
  - KPWK (727)
    + AirVenture 2013 (32 Notes)
    + Grass strip (12 Notes)
    + Rochelle cafe (27 Notes)
    + Great pie trip! (3 Notes)
    + Cheap avgas at BUU (18 Notes)
    + Rough River, KY (7 Notes)
    + North Vernon, IN (3 Notes)
    + Rantoul museum (11 Notes)
    + Grissom AFRB museum (17 Notes)
    + Door County, WI (23 Notes)
    + Tucson trip (19 Notes)
    + San Diego trip (11 Notes)
    + Florida Keys (9 Notes)
    + DuPage training (5 Notes)
  ▼Down  ▲Previous  ▲Top  ▼Bottom
  + KPRG (1)
  ▼Down  ▲Previous  ▲Top  ▼Bottom + Destination airports (405)
+ Tail Number (433)
+ NavFriend pilot (1221)
+ Attractions (403)

| Home | My Logbook | My NavFriends | Share New Route | Search Routes | Popular/Featured Routes | Help |

Alabama  Alaska  Arizona  Arkansas  California  Colorado  Connecticut  Delaware  Florida  Georgia  Hawaii  Idaho  Illinois  Indiana  Iowa  Kansas  Kentucky  Louisiana  Maine  Maryland  Massachusetts  Michigan  Minnesota  Mississippi  Missouri  Montana  Nebraska  Nevada  New Hampshire  New Jersey  New Mexico  New York  North Carolina  North Dakota  Ohio  Oklahoma  Oregon  Pennsylvania  Rhode Island  South Carolina  South Dakota  Tennessee  Texas  Utah  Vermont  Virginia  Washington  West Virginia  Wisconsin  Wyoming  American Samoa  Guam  Northern Mariana Islands  Puerto Rico  U.S. Virgin Islands Date: July 1, 2013

| NavFriend: | John Smith | Route name: | Great pie trip! (1/3) |
| Aircraft type: | TOBA | Attraction: | Restaurant @ I74 (OH) |
| Tail Number: | N3059D | Fuel: | $5.49 100LL |

| Route: | KPWK  OBK  3CK  KLOT  I74 |
| Highest Alt: | 7000 ft. |
| Comments: | Be sure to check to see if MOA near KGUS is active. KGUS approach guys are very helpful. Restaurant cook will bake a pie for you while you eat lunch! |

[PHOTOS]  [NAVFRIEND PILOT PROFILE]  [PILOT]  [AIRCRAFT]

| COMMENT | REPLY | PERSONAL MESSAGE |
| RATE | SHARE | SOCIAL MEDIA POST |
| FLAG | HAZARD | AMEND/ADD/UPDATE |
| WISH LIST | NAVFRIENDS | AFD |
| COPY | FILE | WEATHER/OVERLAY |
| BRIEF | TFR/OVERLAY | NOTAMS |

All NavFriend Routes

Illinois
- Departure airports (173, 2 New)
  + 10C (27)
  + 3CK (97)
  + KARR (322)
  + KIGQ (233)
  + KIKK (39)
  - KPWK (727)
    + AirVenture 2013 (32 Notes)
    + Grass strip (12 Notes)
    + Rochelle cafe (27 Notes)
    - Great pie trip! (J. Smith, 7/1/2013)
      Great pie trip! (E. Jones, 7/1/2013)
      Great pie trip! (R. Dupe, 7/2/2013)
    + Cheap avgas at BUU (18 Notes)
    + Rough River, KY (7 Notes)
    + North Vernon, IN (3 Notes)
    + Rantoul museum (11 Notes)
    + Grissom AFRB museum (17 Notes)
    + Door County, WI (23 Notes)
    + Tucson trip (19 Notes)
    + San Diego trip (11 Notes)
    + Florida Keys (9 Notes)
    + DuPage training (5 Notes)
    ▼ Down ▲ Previous ⇱ Top ⇲ Bottom
  + KPRG (1)
  ▼ Down ▲ Previous ⇱ Top ⇲ Bottom
+ Destination airports (405)
+ Tail Number (433)
+ NavFriend pilot (1221)
+ Attractions (403)

DATABASE SYSTEM TO ORGANIZE SELECTABLE ITEMS FOR USERS RELATED TO ROUTE PLANNING

CROSS-REFERENCE TO RELATED APPLICATIONS

This present application is a Continuation application of application Ser. No. 17/140,066, filed Jan. 2, 2021, which is a continuation of application Ser. No. 16/693,165, filed Nov. 22, 2019, which is a continuation of application Ser. No. 15/417,653 filed on Jan. 27, 2017, now U.S. Pat. No. 10,490,087, issued on Nov. 26, 2019, which is a continuation of application Ser. No. 14/518,158, filed on Oct. 20, 2014, now abandoned, which claims priority to U.S. provisional Patent Application No. 61/961,739, filed Oct. 21, 2013, entitled, "Database System To Organize Selectable Items For Users Related to Route Planning." Every patent application and patent identified immediately above in this paragraph are hereby incorporated by reference.

BACKGROUND

In the field of aviation and general aviation—unless a pilot restricts him or herself to flying locally at a departure airport—a pilot operates an aircraft to fly from a departure airport, such as the pilot's home airport, to a destination airport along a route selected by the pilot. Many times, for example, a general aviation pilot may have a destination airport in mind but the flight required is beyond the local area of a pilot's home airport, e.g., beyond 50 nautical miles. In such case, the pilot may be unfamiliar with the route and/or destination airport. Other times a pilot may not even have a destination airport in mind and may desire to fly to a new destination airport previously un-flown route. For example, the term "hundred-dollar hamburger" is slang in aviation for an excuse a general aviation pilot might use to fly to a new or a known destination airport. Such a flight typically involves flying a short, or sometimes long, distance to a destination airport, stopping and eating a meal at an airport restaurant, and then flying back to the pilot's home airport. The term originally referred to the approximate cost of renting or operating a light general aviation aircraft, such as a Cessna 172, to fly round-trip to a nearby airport. E.g., http://en.wikipedia.org/wiki/$100_hamburger, and contents therein.

Whether a pilot has a known destination airport, a new destination airport in mind, or has not yet chosen a destination airport for a flight, the pilot is required to conduct flight planning prior to each flight according to Federal Aviation Regulations ("FARs"). For example, FAR 91.103 says: "Each pilot in command shall, before beginning a flight, become familiar with all available information concerning that flight. This information must include: (a) For a flight under IFR or a flight not in the vicinity of an airport, weather reports and forecasts, fuel requirements, alternatives available if the flight cannot be completed, and any known traffic delays of which the pilot in command has been advised by ATC; (b) For any flight, runway lengths at airports of intended use, and the following takeoff and landing distance information: (1) For civil aircraft for which an approved Airplane or Rotorcraft Flight Manual containing takeoff and landing distance data is required, the takeoff and landing distance data contained therein; and (2) For civil aircraft other than those specified in paragraph (b)(1) of this section, other reliable information appropriate to the aircraft, relating to aircraft performance under expected values of airport elevation and runway slope, aircraft gross weight, and wind and temperature." In flight planning, a pilot selects a route to the destination airport with appropriate waypoints or airways. The pilot, among other things: calculates the amount of fuel required to complete the trip; checks for compliance with air traffic control requirements; checks for clearance from terrain and structures near takeoff and landing areas; considers potentials for mid-air collisions; and avoids restricted or prohibited areas of flight and the like. In addition to these hazards issues, a pilot making a flight plan may attempt to minimize overall flight costs by selecting the most efficient route, height, and speed for the aircraft type and sometimes seek to load the minimum necessary fuel, plus a safety reserve, on board, to maximize flight efficiencies. For flights having a longer duration, fixed base operators ("FBOs") having disparate prices for aviation fuel for sale to pilots are utilized at airports along the way.

Since the shortest distance between two points is a straight line, pilots may desire direct routes for certain flights. Quite often, however, there are factors that should be considered that may make a direct flight undesirable. Mountainous terrain, restricted airspace, prohibited airspace, military operating areas ("MOAs"), and temporary flight restrictions ("TFRs"), for example, present obstacles to direct flights. In single-engine aircraft, pilots should give consideration to circumnavigating large, desolate areas or large bodies of water. Pilots should also consider the single-engine service ceiling of multiengine aircraft when operating over high altitude terrain since the terrain elevation may be higher than the single-engine ceiling of the multiengine aircraft being flown, e.g., a multiengine aircraft with a single-engine service ceiling of 6,000 feet cannot fly a route with terrain at 9,000 feet elevation. Precise flight planning of log items, such as pre-computed courses, time, distance, navigational aids, and frequencies to be used will make enroute errors in these items less likely. Special attention should be given to fuel requirements, keeping in mind the need for an ample reserve as well as location of refueling points available as the preflight progresses. A booklet known as the Airport/Facility Directory, published by the National Ocean Service, lists airports, seaplane bases, and heliports open to the public, as well as communications data, navigational facilities, and certain special notices such as parachute jumping, Flight Service Station ("FSS")/National Weather Service ("NWS") telephone numbers, preferred routes, and aeronautical chart bulletins. In addition, pilots should check with the nearest FSS for an update on the latest Notices to Airmen ("NOTAMs"). Pilots should avail themselves of all appropriate charts and publications, including the Airman's Information Manual ("AIM") and NOTAMs. A weather briefing is an important part of preflight planning. An overview of the synoptic situation and general weather conditions can be obtained from public media (radio, TV, etc.) or by telephone from recorded sources to help the pilot to better understand the overall weather picture when obtaining a complete briefing from a FSS. Information on weather sources is contained in the Meteorology chapter of the AIM, available from faa.gov. For example, accurate weather forecasts are desired to allow for accurate fuel consumption calculations based on effects of head or tail winds and air temperature. Aircraft flying IFR in controlled airspace may be required to follow predetermined routes known as airways, even if such routes are not as economical as a more direct flight. Additionally, the performance of each different aircraft type varies based on altitude, air pressure, temperature and weight. When attempting to formulate an efficient flight plan, one quickly discovers that a large number of decisions and calculations are required in order to formulate an effective flight plan. Many flight plans follow routes at available altitudes which have the most favorable current or forecast weather conditions. However, sometimes these are not the most efficient routes under varying circumstances. Flight planning will benefit from accurate and up-to-date information shared by other pilots.

In addition to a pilot performing flight planning prior to a flight, a pilot (or a flight's dispatcher or controller) may or may not file a flight plan document (in paper or electronic form) with the Federal Aviation Administration ("FAA") or with a foreign civil aviation authority. When used, these flight plan documents typically are filed (via in person, electronically or telephone) prior to the flight's departure from the departure airport, although a pilot may file a flight plan in flight as well via radio. A flight plan in the United States generally includes departure date, time, and a departure and a destination airport, and a route, including any waypoints with proper FAA identifiers. In addition, a flight plan includes the aircraft identification or registration (a.k.a. the aircraft's tail number, for example, "N56783") and aircraft type (e.g., "TOBA" for a Socata TB200 aircraft), an estimated time enroute, a listing of alternate airports for use in the event of bad weather, the type of flight (either instrument flight rules ("IFR") or visual flight rules ("VFR"), pilot's name, and the number of persons on board the aircraft. For IFR flights, flight plans are used by air traffic control to initiate tracking and routing services. For VFR flights, their only purpose is to provide needed information should search and rescue operations be required, or for use by air traffic control when flying in a "Special Flight Rules Area." In the United States, flight plans are required for all flights flown under IFR. After an IFR flight plan is activated and an IFR clearance (and an IFR release if necessary) is obtained from air traffic control, air traffic control may initiate radar tracking and routing services for the aircraft either under its flight number or aircraft registration that was provided in the flight plan. For VFR flying, a pilot is not required to file a flight plan with the FAA unless the flight's path will cross national borders. Flight plans are recommended for VFR flights because they provide a way of alerting rescuers if the flight is overdue at its destination airport, and they can enable a service known as "flight following" that utilizes ATC radar to warn of other nearby air traffic enroute. Pilots flying VFR routes, however, do not commonly file flight plans.

The prior art includes known means for pilots to obtain information about new airport destinations, or to obtain information used to perform flight planning but such prior art systems are limited. For example, a simple means is that known as "hangar flying." This term originated from the hangar building where aircraft are maintained or stored. Starting from the early days of flying, when the weather was poor for example, local pilots sat around a coffee pot and talked about flying. The topics of these informal gatherings ranged from regulations, techniques, flight instruction, and flying in general. Pilots may discuss flights he or she has taken. In addition, a pilot may utilize folding paper navigational charts on which a pilot can mentally review his or her intended route of flight. The pilot may draw a line on the chart representing the true course, and review the projected path across the face of the chart for the location of good checkpoints, restricted areas, obstructions, other flight hazards, and suitable airports. For VFR flight, pilot planning by either pilotage or dead reckoning may be done utilizing a chart known as the Sectional Aeronautical Chart, which is scaled at 1/500,000, or 8 miles to the inch. The physical characteristics of most landmarks are shown in detail and the pilot identifies selected landmarks along the route of flight. Another chart is the World Aeronautical Chart ("WAC"), with a scale of 1/1,000,000, or 16 mile to the inch. Many U.S. states print also aeronautical charts for VFR navigation within their state boundaries. E.g., http://aystop.com/technical/preflight/preflight.htm.

A sectional chart is a two-sided chart created from a Lambert Conformal Conic Projection with two defined standard parallels. The scale is 1:500,000, with a contour interval of 500 feet. The size of each sectional is designed to be "arm's width" when completely unfolded. The "northern" half of the section is on one side of the chart, and the "southern" on the obverse. The edges between north and south are designed with a calibrated overlap that permits plotting extensions of course lines from one side to the other, once the user has scribed a corresponding "match line" on each side. All other edges are truncated at a predetermined size. White space around the chart is filled with map information and the legend, scales, and tables of airport and airspace information. Terrain is color-coded for its elevation and major roads, cities, and bodies of water are shown for visual reference, as well as other identifiable structures (e.g., stadiums and water towers). However, most of the layers of data on the charts include specific information about obstacles, airspace designations, and facility information (locations, radio frequencies, etc.). The legend divides these into several types of information, namely: airports, radio aids, traffic and airspace services, obstructions, topographic, and miscellaneous. Other unusual features may be designated on the map with symbols that do not appear in the legend, such as areas where laser lights are routinely pointed into the air (a jagged-edged circle), or a wildlife protection area (a solid line with dots along the inside edge). The location of each airport and presence of control towers is indicated with a circle, or with an outline of the hard-surfaced runways (if over 8,069 feet long). Blue shows an airport with a control tower and magenta for others. Military airstrips (without hard-surface runways) are shown with two concentric circles. Private airports are shown with the letter "R" inside a circle. A heliport is designated with "H" in a circle. An unverified airstrip is shown with a "U" in a circle. An abandoned airport with paved runways is shown with a circle having an "X" over it.

The prior art also includes general reference to electronic means related to aircraft flights, such as U.S. Pat. No. 8,266,547 which relates to a graphical user interface for a travel planning system. U.S. Pat. No. 8,521,342 relates to a system, a method and a computer program for recording technical issues of an aircraft, for use during flight tests on board of the aircraft. A client unit sends an access request to a server, which receives and processes this request, permits access to the data and restricts the adding or modifying processing of the data to one client unit at a time. U.S. Pat. No. 7,779,023 relates to an internet website which presents a hierarchical menu structure to users includes a personalization engine to automatically modify the menu structure for each user. U.S. Pat. No. 7,668,744 relates to a fleet engine, a crew engine, a passenger engine and an integration engine that communicate with a distributed computer network via two-way communication channels to monitor and repair disruptions to schedules particularly in the airline industry. When a disruption occurs, the method will produce a plurality of solutions that are structurally different for evaluation by the controller or operations manager. U.S. Pat. No. 7,786,899 relates to flight tracking and a computer-implemented system where a plurality of flight information is received over a digital network and is stored in at least a database. The database includes aviation information as well as aviation related content and advertisements. In addition, the user may create personalized messages and status update for display in response to a variety of flight conditions. For example, a user is able to select a set of flights from a set of flights scheduled for arrival/departure from a designated airport/facility that typically are not regularly scheduled commercial flights. A customized display is then presented on a monitor operated by the user which presents the information in a value added format that is triggered or sequenced based on flight tracking data. Value added information can include an automatic instruction for the line crew to get the fuel truck, or for the ground transportation services to be called, as a condition of the estimated time of arrival. Similarly, it can include advertisements related to the flight information such that some advertisements are shown only before arrival and others only after arrival or shortly before departure.

In addition, electronic systems have been developed which provide flight planning and navigational information to a pilot but such prior art systems are also limited. For example, U.S. Pat. No. 8,380,366 simply concerns an apparatus having a graphical touch screen for flight planning and navigation of an aircraft by a pilot. U.S. Pat. No. 8,185,298 relates to hybrid-heuristic optimization of competing portfolios of flight paths for flights through one or more sectors of an airspace represented by an air traffic system. In addition, there are electronic systems which are generally accessed by users from local computers via a telecommunications network, such as cellular telephone, wired telecommunications, short-range wireless, or a combination thereof. Such systems sometimes are known as flight planning tools, and are accessible through well-known commercial providers of flight planning information for general and commercial aviation navigation such as Foreflight, flightaware.com, airnav.com, duats.com, or skyvector.com, for example. A course line may be provided by skyvector.com, for example, to a user in the form of a line generated by a computer on electronic navigational charts. Similarly, U.S. Pat. No. 8,447,512 relates to a process for generating computer flight plans on the Internet with the elements of: a raw XY&Z database of chart data, a database containing aircraft data, a software system to create VFR, IFR and road charts, an Internet web site accessible by a client computer, a software system which computes flight plans requested by the client computer, a software system which allows for navigation data and aircraft editing by means of the Internet web site client computer, and a software system which allows for outputting flight plans by means of the Internet web site client computer. These systems, however, are limited in the information they may provide a pilot trying to select a new destination airport, or trying to determine a practical route to fly as recommended by other pilots familiar with the route and/or destination airport, for example. Also, such electronic systems do not disclose or teach a database created by utilizing routes selected for sharing with pilot users by other pilot users, linking pilot user comments to a displayed route, e.g., relating to hazards, terrain, obstacles, favorites, or permit interactive discussion by pilots of a displayed route, for example.

Also, for example, prior art U.S. Pat. No. 8,214,144 of Flightaware relates to a computer-implemented system and method for the processing and optimization of flight plans. Information regarding a plurality of previous flight plans is received over a digital network and is stored in at least a database. The database preferably includes aviation fuel price information, aircraft performance information, and aviation weather information as well. Upon receiving a request, a server generates at least an optimized portion of a flight plan. In one form, historical flight plan data of others is automatically used to aid in a computer determination of the optimized route offered to the user for review, with the resulting final flight plan being electronically filed with the FAA upon approval. In a further form, the user may arrange fuel transactions at intermediate destinations with the service provider receiving a fee in exchange for facilitating the transaction. This prior art system, however, does not disclose or teach a database created by utilizing routes selected for use by other pilot users, linking pilot user comments to a displayed route, or permit interactive discussion by pilots of a displayed route, for example. Also, for example, this prior art system utilizes an unintelligent database, e.g., it utilizes a database made indiscriminately from all filed flight plans (including those amended enroute by FAA changes) and radar followed aircraft for any given period of time such as a day or any fraction or multiplier thereof (which could include thousands or tens of thousands of flight plans), and/or calculates an optimized route for the flight based upon aircraft performance data, available fuel costs, and current or forecast aviation weather. Such a structure is not particularly useful for airport destination selection and route selection by a pilot.

Also, for example, U.S. Pat. No. 8,296,281 of Flightaware relates to a computer-implemented system and method processes flight position information and provides a notification to a remote user in response to a triggering event. Typically, flight position data is received over a digital network. The service accepts requests for notification based upon the position of a specified flight and subsequently provides that notification based upon the flight position data. Upon receiving a user query, a server retrieves a result set from the flight position data and determines if the triggering criteria has been met. In one form, the requested notification may be presented to the user in the form of an e-mail, telephone call, text message or the like. Also disclosed is a system for flight tracking or planning which includes photographs supplied by remote users of the aircraft for which the tracking or planning is associated, for use by other remote users that see the association of the supplied photos with the tracked or planned flight. Also disclosed is a social system for use with flight tracking or planning which allows affiliated users to share information to the exclusion of other non-affiliated users.

The system of the '281 patent and other similar prior art systems however, are limited. For example, information is accessible by aircraft registration or flight number not by pilot user or pilot identifier. In addition to the above shortcomings, the database of information is not intelligently built, for example. As discussed in the '281 patent, the FAA made a wealth of minute-by-minute flight-tracking information available for distribution to the public with the creation of the Aircraft Situation Display to Industry ("ASDI") service, staring in 1995. Through this service, with the exception of a request by an owner or operator to block particular aircraft, flight tracking data is made available to several vendors who are subsequently able to provide information in a value-added format to their subscribers or other users. The ASDI information includes location, altitude, airspeed, origin, destination, estimated time of arrival and tail number or designated identifier of air carrier and general aviation aircraft operating on at least the corresponding IFR flight plans within U.S. airspace. General aviation VFR flights that include air traffic control flight following are often included. Traditional subscribers include flight departments, charter operators, limousine firms, airframe and power plant manufacturers, air carriers, FBOs, research firms, and other users. For example, without ASDI information an aircraft service provider may not reliably know much in advance as to when food service or fuel would need to be delivered for incoming flights, so as to give its employees time to prepare just enough in advance as to have the food at the right temperature and condition, and the fuel truck in position, at the appropriate time, but with a minimum of waiting. In a similar manner, a casual user could not receive reliable advance notification as to when to leave to go to the airport to meet or pick up someone from an arriving flight so that neither would need to wait on the other. With the advent of this structure, a number of subscribers and other users were able to obtain valuable flight information and increase the efficiency and reliability of their services. This prior art system, while describing accessing information from remote users, does not teach or describe the novel and inventive system disclosed herein. For example, this prior art system instead discloses users only supplying what it calls "content segments" associated with a geographic location; these "content segments" are not routes of flight of a user, waypoints, or even comments on such a route of flight, but are disclosed only as reviews of an FBO, reviews of a caterer, or reviews of a limousine provider located on or servicing a selected airport, or information regarding an entity similar to an FBO, caterer or limousine provider; for routes of flight this system is tied and limited to a database of routes of flight built up en masse from the ASDI service.

In addition to shortcomings previously discussed, because these prior art electronic systems rely upon a database built up, e.g., en masse from the ASDI service or other similar sources, the database of information is not intelligently built or selective in the routes retained in its databases, and accordingly can be both over-inclusive and under-inclusive in their dataset of flight plans and/or routes of other pilots. Such shortcomings, for example, greatly limit their usefulness for a pilot desiring information for a new destination airport and desiring information for a new, previously unknown route to a destination airport. For example, these prior art electronic systems do not necessarily provide access to historical routes for entire trips, only routes for what is filed or provided by the FAA or ASDI service. A pilot (dispatcher or controller), for example, may file a flight plan with the FAA for an airport that is only intermediate to his or her destination, then fly another leg to the destination airport. Also, a pilot my file a flight plan, e.g. IFR flight plan, for one leg, but fly VFR and not file a flight plan for a second, third or final leg. Or a pilot may fly to a destination airport solely VFR and file no flight plan (or obtain no radar flight following) at all. A system with a database such as that built from the ADSI service will not account for these omissions, and does not concern itself with such flights because it was not designed by the FAA for that purpose—it only includes those flights for which IFR flight plans are activated and tracked and/or for VFR flights the receive flight following. On the other hand, an equally vexing shortcoming is that such a prior art system then includes, robotically, without selection, all such flights in its database. Because prior art electronic systems are automatic, robotic in their collection of data from FAA databases or the like, these systems do not know that multiple flight plans may be involved in a pilot's route to a destination airport, nor will such systems know whether the collected flight plan is only an incomplete part of a route. Likewise, for these prior art electronic systems, if a flight does not have a filed flight plan or radar flight following, the flight's route does not get collected into the prior art electronic systems database, e.g., because the flight's route is not in the FAA's data. Such a prior art system may include another pilot's destination airport and route information without such pilot having even used such system or even knowing that it has been collected en masse for inclusion in a database.

Other prior art electronic systems provide a pilot only limited information, such as through a basic message board. Still other prior art systems, such as socialflight.com and adventurepilot.com, provide event or e.g. restaurant, airport or point of interest information, listed or displayed on an automobile or other non-aviation type map. While such systems identify a destination with airport identifiers and reader comments on a destination, they do not provide access by a pilot user to route information with FAA (or ICAO) waypoints, airway identifiers that have been selected by other pilot users, or access to route information of other pilot users linked to a destination attraction, or access to pilot information, route comments by other pilot users. Also, for example, even this basic information is cumbersome to use because these systems permit users who are not pilots to select information for inclusion in the database, creating a system that is an advertising billboard rather than a useful database of destinations linked with route information (nor pilot discussion of route information, hazards, altitudes, waypoints, etc.) of other pilot users for an pilot user.

In addition, such systems are not structured to provide routes or useful route information, and can be nearly useless for flight planning, or even hazardous for flight planning. For example, such systems can provide a user a list of destinations that are over 500 or more nautical miles away from a desired airport, regardless if another pilot has flown to that destination from an pilot's desired departure (e.g. home) airport; and in any event the database is not structured for entry by other pilots of route waypoints, route information, hazards, airspace or altitude information, for example. Included destinations are not selected for database entry dependent on a particular departure airport (e.g., your home airport), or with regard to a particular route of another pilot, or whether another pilot has even flown to such destination from your airport. An imaginary line on a map to a destination airport is generated by a query to a computer, e.g., by adventurepilot.com, as a route rather than a route selected and actually flown by another pilot, for example. This imaginary route can depict a line through restricted airspace, over miles of water, or into hazardous terrain, e.g., through mountainous terrain, that exceeds the flight capability of an aircraft rendering it useless for flight planning. As a result, such systems are cumbersome to use, and are unreliable, very limited or even hazardous in assisting a pilot user in considering flight destinations, e.g., for cross country flight, and do not add to flight planning safety or ease of mind. In addition to the above shortcomings, such systems do not allow access to pilot user logbook information or provide tail number information, for example.

Prior art systems and their shortcomings do not obviate the need of a pilot to start from scratch, so to speak, every time a general aviation pilot desires to select a new airport destination and select a new route related thereto, with linked pilot comments on route, destination, etc. Other aspects of such prior art systems add to their limits and inconvenience if used. These systems are difficult for a user to access and collect information for flight planning, for example, because the systems do not carry the desired information in its database, or if it is in a database it is obscured by other information. Because the systems are discrete, they do not include all components, including the route, new airport destination, attraction, other pilot comments, or selective building of a database. Therefore, there is a need for a routing and information system that continually provides access to up-to-date, correct geographic information by a local user. There is a further need for a routing and information system which can be implemented on handheld, portable devices for easy, convenient transportation and use. There is a further need for a routing and information system which is independent of any particular hardware configuration and which may be implemented on any suitably equipped data processing apparatus, such as a desktop personal computer, a laptop computer, a personal digital assistant, tablet computer or mobile telephone computer. There is a further need for a routing and information system which provides communication between mobile units and a base unit over any available channel, including wireless, wireline, and optical channels. There is a still further need for a data communication protocol for providing accurate, reliable communication in such a system, independent of hardware configuration and in a compact form.

These prior art systems have many drawbacks, however, which have prevented widespread use as a tool by general aviation pilots to aid them in selecting airport destinations and routes. Information is discrete to a site or system and unlinked to other information and, even if available, is only potentially available after a cumbersome search of multiple sites or systems, and what information is available is cluttered and unorganized, based on a gross collection of data rather than pilot user selected data, and many times directed only to needs of commercial airline operators and operations rather than general aviation pilots. The present disclosure solves these shortcomings as well as other problems that pilots face when collecting flight information from other pilots, particularly related to airport destinations, routes and attractions. The present disclosure solves a number of these inefficiencies as well as other problems present in the process of flight planning, as are illustrated in the descriptions that follow.

SUMMARY OF THE INVENTION

The invention and embodiments thereof relate generally to an electronic system for providing access to a useable database of selectable items for a user, e.g., user selectable routes entered by pilot users to utilize for flight planning and aircraft route guidance, and other related information from a remote processing center to a local unit over wireless, wire line, or telecommunications network or combination thereof. The invention and embodiments thereof more particularly relate, for example, to an electronic system including one or more remote processing centers and a plurality of local units, e.g., a desktop computer, laptop, tablet, cellular device, or mobile telephone unit, for providing to a pilot's local unit information of other pilot users from one or more databases, in particular, a pilot user's route with FAA identifiers (such as airports, VORs, NDBs, waypoints, reporting points, airways, etc.), waypoints, departure airport, destination airport, hazards, FAA VFR sectional and/or IFR airway map for guidance, pilot comments, and other information which has been calculated and/or stored at one or more remote processing centers in response to a query or selection request received from a local unit operated by an pilot user, for example. In addition, one or more databases of stored destination airport, departure airport, route, attraction, FBO information, fuel information, hazards, weather, altitude, route information, and/or one or more other pilots' comments on route and other information, etc. or combination thereof is intelligently built up for storage at one or more remote processing centers via pilot users selectively transmitting data, e.g., departure airport, destination airport, route information, from local units via wireless, wire line, or telecommunications network or combination thereof for inclusion in one or more databases to allow creation of relevant, useful, understandable information for other pilot users, for example.

In addition, an electronic system and information of other pilot users selectively transmitted and stored in one or more databases of the present invention can be organized for viewing on a local unit in an organized, easy to follow and navigate format, for example, permitting a pilot operating a local unit to seek an airport destination, related route, route information and/or commentary based on country, region, state, province, or departure airport, or name or personal identifier of another pilot user. In addition, an electronic system of the present invention can provide a list of current pilot users of the system, those who have accessed the system that day, and other statistics of pilot users such as total number of routes submitted, recent number of routes submitted, popular routes of the day, month or year, e.g., organized by state, departure or destination airport, for example. It is to be expressly understood, however, that the embodiments described herein, and each of the figures, are provided as examples and for the purpose of illustration and description only and they and use of the terms such as "the invention" or "the present invention" are not intended as a definition of the limits of the scope or embodiments of the disclosure of this invention. The priority application or any changes or differences, including any typographical or grammatical changes, between the present disclosure and priority U.S. Provisional Patent Application No. 61/958,123 should not be read to limit or impair the scope of the present disclosure.

BRIEF DESCRIPTION OF THE DRAWINGS

FIG. 7 illustrates a fourth sample display of a unit for accessing information from a database of routes and linked information.

FIG. 8 illustrates a fifth sample display of a unit for accessing information from a database of routes and linked information.

DETAILED DESCRIPTION OF THE INVENTION

Figure 1:
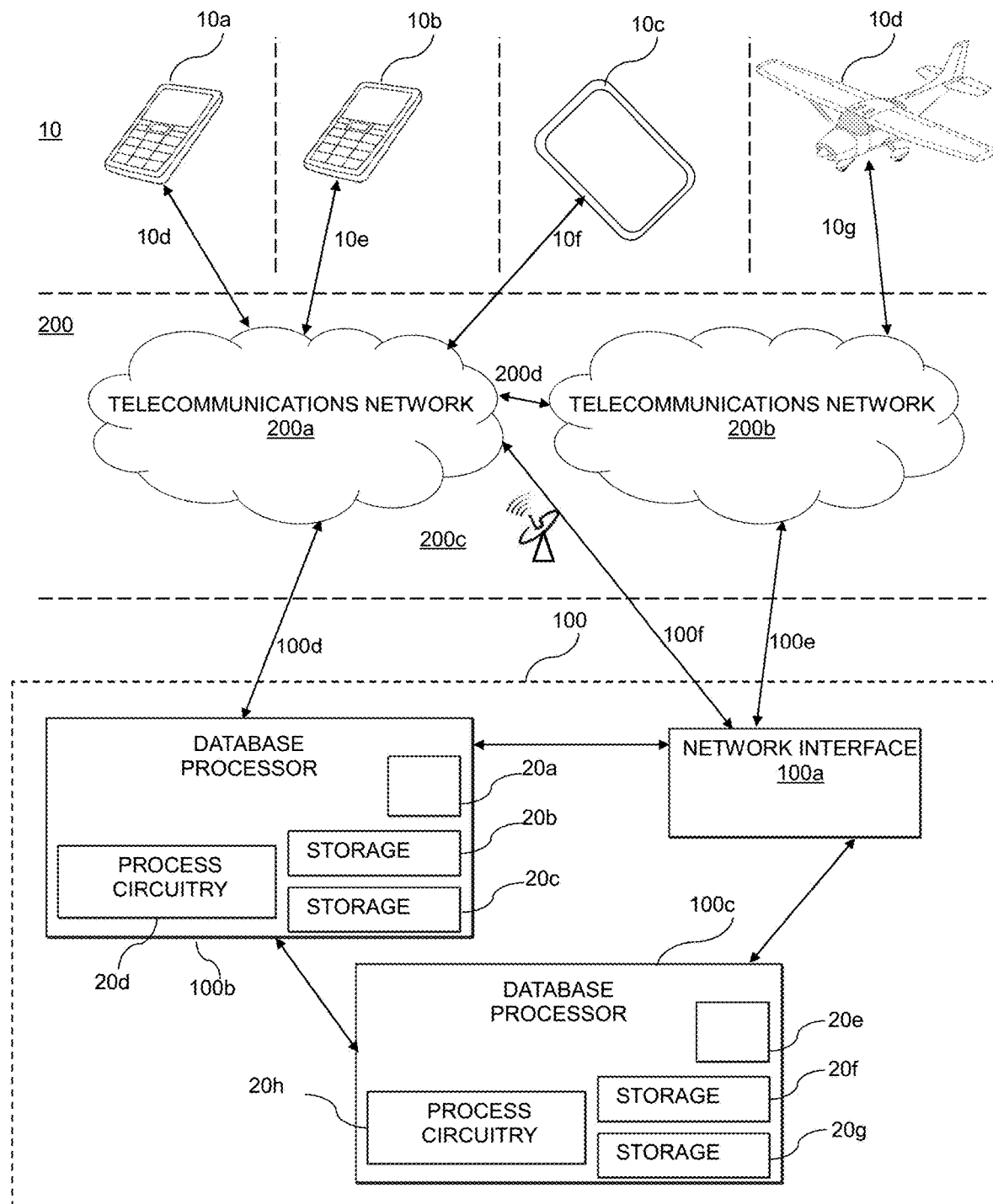
FIG. 1 illustrates a block type diagram of an electronic system including a network according to one example embodiment.

For the purposes of understanding of the principles of the invention, reference is made to embodiments illustrated in the drawings and specific language used to describe the same. It is understood, however, that no limitation of the scope of the invention is thereby intended. Any alterations and further modifications in the described example embodiments, and any further applications of the principles of the disclosure as described herein are contemplated as would normally occur to one skilled in the art to which the invention relates.

Currently, a general aviation pilot attempting to select a new airport destination and to select an associated route, perform flight planning to a new airport destination, particularly for VFR flight, is a time consuming, burdensome, and inefficient process. Pilots have to choose new airport destinations, plan their own routes without the insight of other pilots, or use word-of-mouth methods to determine recommended flight routes, waypoints, hazards, and the like. While certain flight plans of aircraft tail numbers filed with the FAA can be obtained and searched through electronic systems, searching these systems can be as or even more cumbersome than planning a flight route from scratch. As stated in the prior art, on any given day, more than 87,000 flights take to the skies in the United States, for example. Only 35 percent, or just over 30,000, of those flights are commercial carriers, such as American Airlines, United, or Southwest. The majority of the remaining flights, roughly 50,000, are general aviation flights and air taxi flights, with the remaining being either military or cargo aircraft. While each of these daily flights is not required to submit a flight plan, a substantial portion of them do; accordingly, any database that relies on collecting such daily FAA data en masse, rather than, for example, utilizing pilot recommended and selected airport destinations and linked recommended and selected routes, actually flown by another pilot, and pilot comments, suffers from the proverbial finding of a needle in a haystack, for example. In addition, such prior art systems do not collect other potentially relevant routes, for example, un-filed VFR routes. And, even were such information found by a pilot it is unlinked to the comments and recommendations of the pilot who flew the route and who desires to fly it as a new airport destination and route, or concerns aircraft types, altitudes, and/or routes of little use to other pilot users. Until the present invention, an electronic system allowing a pilot user to find a list of new airport destinations recommended and selected by other (local or remote) pilots, with recommended and selected routes by other pilots, and linked comments by other pilots have been unknown, and finding such information has been impossible to obtain in a useful or usable manner. Another advantage of the present disclosure is that the structure of the system is more likely to encourage pilot use of the system, encourage pilot sharing of flight planning information, encourage pilot interest in new flying destinations which he or she otherwise would not be aware or have considered, and enhance flying safety for pilot users.

FIG. 1 is a diagrammatic view of a multi-site electronic system of one embodiment of the present invention, providing an overall structure of an example embodiment according to the present invention. A plurality of pilot users utilizes local units 10 to access a remote processing center 100 via telecommunications network 200. Depicted are local units in a form of handheld mobile devices 10a, 10b and 10c. One or more of these units could alternatively be in a form of a desktop unit, a laptop, or other portable unit, for example. Local units 10 include a display, memory for retention of information, processing circuitry, one or more input means for a user, power supply, and telecommunications interface. A handheld unit 10a preferably may comprise a combined display and input means in a form of eight to ten inch LCD capacitive, active matrix touchscreen, memory including 64 GB solid state, flash type storage, a dual-core 1 GHz processor and related chipsets programmed with an operating system, removable rechargeable Li-On or Li—Po battery, and telecommunications interface in a form of GSM, CDMA, EDGE, HSDPA, LTE 700, GPS and/or 802.11 radio chipsets and related antenna, or combination thereof, for example. Also depicted is a local unit in a form of an aircraft, 10d, wherein one or more devices within the aircraft comprise components to transmit to and receive information from remote processing center 100 via telecommunications network 200, for example, a panel or yoke mounted device with a display, memory for retention of information, a touchscreen interface for a pilot user, and a connection to an antenna for wireless communication, such as via satellite. Telecommunications network 200 can be considered comprised of multiple or single networks, for example network 200 can comprise telecommunications network 200a or 200b, wired and/or wireless connections 10d, 10e, 10f, 10g, 200d, 100d, 100e or 100f, or combination thereof. Preferably telecommunications network 200 comprises a public telecommunications network permitting wireless communication of data, for example, via satellite, GSM, EDGE, CDMA, or 802.11 protocols, or combination thereof. Alternatively, telecommunications network 200 comprises wired network, for example, PTN, cable and/or DSL connections, in addition to or in lieu of wireless communication.

Also depicted is remote processing center 100 which comprises one or more network interfaces 100a, and one or more database processors, e.g., 100b, 100c. A database processor 100a, for example, comprises network interface 20a that may be utilized in lieu of or in addition to network interface 100a, storage 20b, 20c, and process circuitry 20d. A database processor 100a comprises one or more intelligent databases, e.g., maintained in storage 20b and/or 20c, accessible by a user of one of units 10 via telecommunications network 200 and wired and/or wireless connections, e.g., 10g, 100e. A database processor 100a may comprise one or more computers comprising programming arranged to fetch and deliver content for display, to a unit 10, in response to a request for content transmitted from a unit 10 to such one or more computers, e.g., via telecommunications network 200, utilizing an appropriate address and transfer protocol, e.g., a locator, for delivering such content. In addition, a database processor 100a may comprise one or more computers comprising programming arranged to receive content from units 10, e.g., via telecommunications network 200, utilizing an appropriate address and transfer protocol for receiving such content, e.g., transmitted from a unit 10 subsequent to a transfer of content from a remote processing center, e.g., in response to a request for content transmitted from a unit 10 to such one or more computers, for example to build up an intelligent database. Preferably, one or more database processors can handle multiple, e.g., hundreds or thousands, of requests and/or transmissions via units 10 at any given time. Remote processing center 100 also may utilize a mechanism for temporary storage of content requested by units 10 to reduce lag time and/or loading of the electronic system in providing content to units 10, for example. In addition, remote processing center 100 may also comprise administrator access to administer, control, maintain, and/or correct one or more databases via direct access, e.g., to a database processor or via telecommunications network 200, for example utilizing a unit 10, or alternatively may be part of database processor 100*b* and/or 100*a*, or separate. Remote processing center (or multiple remote processing centers) and/or database processor (or multiple remote processing centers), for example, could be provided by a same computer or varying other arrangements of computers at one or more physical locations and still be within the spirit of the invention. In an alternative embodiment, farms of dedicated computers, a single proprietary system, and/or a storage area network could also be provided to support specific features. An example database processor comprises a relational database, such as SQL, as is known to one of skill in the art, for example. Network interface 100*a* may communicate with a database processor via connections 20*h*, 20*j*, 100*d*, 100*e* and/or 100*f*, or combination thereof, which may be wired and/or wireless, for example.

Figure 2:
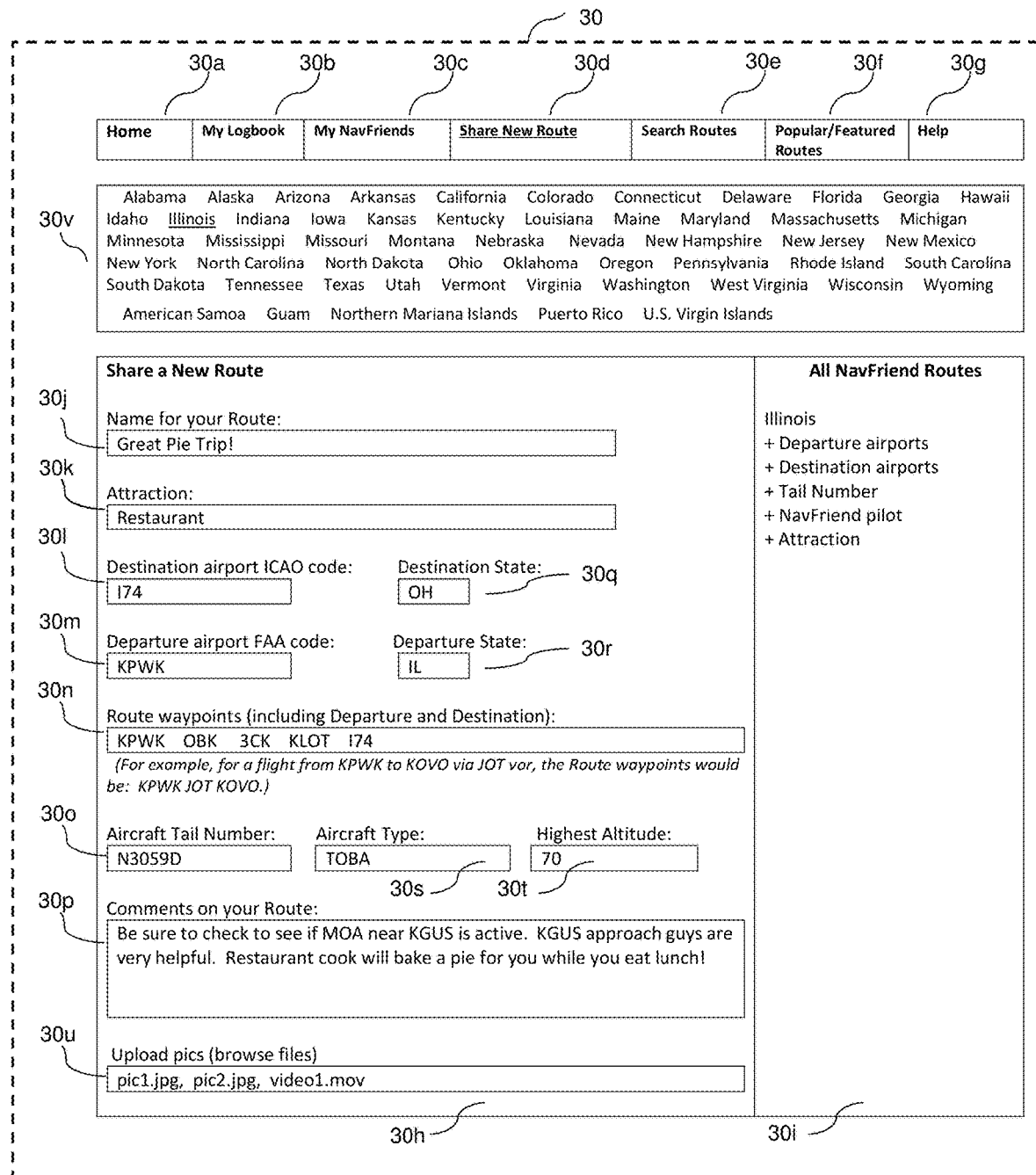
FIG. 2 illustrates an example entry form display of a unit for a pilot user utilized in an electronic system according to one example embodiment.

FIG. 2 is a diagrammatic view of an input display of a unit 10 for a pilot user utilized to build up a database of an example embodiment of the present invention. This illustration provides an example of an input scheme to build an intelligent database for use by data processor 100*b* depicted in FIG. 1 for an example embodiment according to the present invention. Such a database also could be located in data processor 100*c* or distributed among multiple data processors and/or computers. An intelligent database is built, for example, by utilizing certain parameters in this example embodiment, by providing to pilot users an easy to understand data entry form that also requires the pilot user to enter certain required information in addition to entering a route utilizing coded identifiers. In addition, by requiring that users are pilots registered with their respective country's aviation authority (for example, the FAA's Airmen Registry of registered pilot certificates in the United States) it greatly increases likelihood that useful information, particularly useful route information is entered into a database, rather than, e.g., information entered for advertising by non-pilot users who have never planned and flown to an airport destination, for example. Rather than solely relying on second-hand information from other databases, for example, the one or more databases of the example embodiment will be a purpose built system where destination airports, routes, and related information, etc. are selected and built by pilot users for sharing and comment. In addition, comments of pilot users, e.g., are linked to each entered route, for example. In addition, the system can have an option for a pilot user to send a selected route and related information from a flight planning tool to system for entry into database, for example. A pilot user also can use an entry form of a unit 10 in an example embodiment to link or embed still or moving pictures in connection with a route, for example.

As depicted in FIG. 2 in this example embodiment, organization of information for stored pilot user routes focuses on a more limited number of items in one place, unlike prior art items. The sample display 30 includes a top menu 30*a* through 30*g* for a pilot user to select from other displays of the system in this embodiment. Also shown, as will be discussed further below, is a menu 30*v* with selectable items showing each of the fifty states and territories of the United States. To share a new route with other pilot users, a pilot user selects menu item "share new route" 30*d* and display 30 with form 30*h* is presented, for example. Available to a pilot user are specific, blank entry boxes for inputting information to assist in building an intelligent database at a remote processing center, for example. It is noted that the building of an intelligent database already will have begun because a pilot user is selecting a route to share with other pilot users. In the example embodiment of FIG. 2, a pilot user enters:

Name for your Route 30*j*,
Attraction name and/or type 30*k*,
Destination airport's ICAO and/or FAA identifier 30*l*,
Departure airport's ICAO and/or FAA identifier 30*m*,
Route utilizing ICAO and/or FAA identifiers 30*n*,
Aircraft tail number 30*o*,
Comments on your route 30*p*,
Destination State 30*q*,
Departure State 30*r*,
Aircraft type 30*s*,
Altitude 30*t*, and
Still or moving pictures to link 30*u*.

In an alternative or in addition to this example embodiment, a pilot user may have a profile transmitted to database processor for storage to permit use of pre-stored pilot information based on a pilot user having logged into the system, which will obviate the need for a pilot user to re-enter his or her identifying information and confirmation that he or she is an airman registered with the FAA with piloting privileges, for example. In other embodiments, 30*h* can display a place to enter pilot name and other related information, which can be for storage as login information or may be required each time a route is entered. In an example embodiment with a login feature, pilot name and other information, for example, may also be linked to an aircraft tail number, aircraft type and/or a home airport. Also, in alternate embodiments more or less information than depicted in entry form 30*h* may be required to build a database at a database processor. For example, a unit 10 may display certain data entry boxes pre-filled, such as items 30*m*, 30*o*, 30*r* and/or 30*s* based on pilot user login, for example. Also, for example, attraction, destination airport, and route information may be imported to a database processor or a unit 10 from other electronic systems via a telecommunications network, or via a program residing on a unit 10. The parameter 30*j* is a name selected by a pilot user for the route he or she desires to share with other users. In the example embodiment, 30*j* is filled in with the name "Great pie trip!" The parameter 30*k* is a name selected by a pilot user of the attraction at the destination airport he or she desires to share with other users. In the example embodiment, 30*k* is filled in with the name "restaurant." The parameters 30*l* and 30*m* are identifiers for a departure airport and a destination airport selected by a pilot user for a route he or she desires to share with other users. In the example embodiment, 30*l* and 30*m* are filled in with the coded identifiers "KPWK" and "I74," respectively. As is explained further below in connection with pilot user input route information, departure and destination airport parameters are filled in with airport identifier codes, codes which the present example embodiment utilizes to create a user friendly, easy to navigate database for a pilot user, for example.

The parameter 30*n* is a route selected by a pilot user for a route he or she desires to share with other users. In the example embodiment, 30*n* is filled in with the identifier codes "KPWK OBK 3CK KLOT I74." A route is selected for sharing and input by a pilot user that comprises one or more NAVAID identifier codes, airways and/or jetways. According to an example embodiment of the present invention, a route selected for input may also include departure and destination airport identifiers as well as intermediate waypoints. To maintain accuracy of the one or more databases and to simplify use for a pilot user, an embodiment of the present invention takes advantage of location identifiers whereby pilots build up a database of airports and routes selected by them and utilizing these coded identifiers. As now explained, a location identifier is a symbolic representation for the name and the location of an airport, navigation aid, or weather station, and is used for manned air traffic control facilities in air traffic control, telecommunications, computer programming, weather reports, and related services. In the present example embodiment, identifiers of the International Civil Aviation Organization ("ICAO") are used, and where an airport does not have an ICAO identifier but only an FAA identifier, the latter identifier is used. E.g., http://en.wikipedia.org/wiki/Location_identifier. The ICAO is a specialized agency of the United Nations located in the Quartier International of Montreal, Quebec, Canada that has codified principles and techniques of international air navigation and fosters the planning and development of international air transport. The ICAO Council adopts standards and recommended practices concerning air navigation, its infrastructure, flight inspection, prevention of unlawful interference, and facilitation of border-crossing procedures for international civil aviation. Relevant to the present disclosure, the ICAO has established sets of 4-letter location indicators which are published in ICAO Publication 7910. These are used by air traffic control agencies to identify airports and by weather agencies to produce METAR weather reports. The first letter indicates the region; for example, K for the contiguous United States, C for Canada, E for northern Europe, R for the Asian Far East, and Y for Australia. Examples of ICAO location indicators are RPLL for Manila Ninoy Aquino Airport and KORD for Chicago's O'Hare International Airport. ICAO codes are used by air traffic control and airline operations for flight planning, for example. They differ from International Air Transport Association ("IATA") codes, which are generally used for airline timetables, reservations, and baggage tags. For example, the IATA code for London's Heathrow Airport is LHR and its ICAO code is EGLL. Most non-pilot travelers usually see the IATA code on baggage tags and tickets and the ICAO code is used among other things by pilots, air traffic control and prior art flight-tracking services such as flightaware but not in the manner or arrangement of the present disclosure.

The Federal Aviation Administration of the United States utilizes an identifier that is a three-letter or four-letter alphanumeric code identifying United States airports. They replaced an old system that relied on plain language, teletype station identifiers, and weather reporting codes. For nearly all major airports, the letters are alphabetic three-letter codes, such as SFO for San Francisco International Airport. Minor airfields typically have a mix of alphabetic and numeric codes, such as 8N2 for Skydive Chicago Airport and 0B5 for Turners Falls Airport. Private airfields have a four-letter identifier, such as 1CA9 for Los Angeles County Fire Department Heliport. The system is designed to mesh with the Transport Canada Identifiers. Many FAA identifiers become four letter ICAO identifiers, for example, when a K is added to the beginning of the FAA identifier. For example, the FAA identifier for Indianapolis International Airport of "IND" becomes "KIND" as an ICAO identifier. The FAA is the authority for assigning three-letter identifiers (except those beginning with the letters N, W, Y, and Z), three and four character identifiers, and five-letter name codes for the United States and its jurisdictions. The Department of the Navy assigns three-letter identifiers beginning with the letter N for the exclusive use of that Department. Three-letter identifiers are assigned as radio call signs to aeronautical navigation aids; to airports with a manned air traffic control facility or navigational aid within airport boundary; to airports that receive scheduled route air carrier or military airlift service, and to airports designated by the United States Customs Service as Airports of Entry. Some of these identifiers are assigned to certain aviation weather reporting stations. Most one-number plus two-letter identifiers have been assigned to aviation weather reporting and observation stations and special-use locations. Some of these identifiers may be assigned to public-use landing facilities within the United States that do not meet requirements for identifiers in the three-letter series. The number is always in the first position of the three-character combination. Most one-letter plus two-number identifiers are assigned to public-use landing facilities within the United States that do not meet the requirements for identifiers in the three-letter series. Some of these identifiers are also assigned to aviation weather reporting stations. One-letter plus two-number identifiers are keyed by the alphabetical letter. The letter may appear in the first, middle or last position in the combination of three characters. When the letter signifies an Air Traffic Control Center's area, the assignment will not change if the Center's boundaries are realigned. Identifiers in this series, which could conflict with the Victor, Jet or colored airway numbers are not assigned. Two-letter plus two-number identifiers are assigned to private-use landing facilities in the United States that do not meet the requirements for three-character assignments and are keyed by the two-letter Post Office or supplemental abbreviation of the state with which they are associated. The two letter code appears in the first two, middle, or last two positions of the four character code. The use of the FAA identifier system in meteorology ended in 1996 when airways reporting code was replaced by METAR code. The METAR code is dependent wholly on the ICAO identifier system. For NAVAIDs, FAA location identifiers may be three or five lettered codes, for example, "OBK" for the VOR station of Northbrook, Illinois and "PAMME" for the middle marker identifier at Chicago Executive Airport for the ILS runway 16 approach.

Returning to the sample entry display 30 of FIG. 2, parameter 30*o* is an aircraft tail number selected by a pilot user to share with other users the aircraft connected with the route and/or pilot user. In the example embodiment, 30*o* is filled in with the name "N3059D." Parameter 30*s* is an aircraft type identifier selected by a pilot user for the route he or she desires to share with other users. In the example embodiment, 30*s* is filled in with the FAA identifier "TOBA." Parameter 30*p* is comments selected by a pilot user for the route he or she desires to share with other users. In the example embodiment, 30*p* is filled in with comments: "Be sure to check to see if MOA near KGUS is active. KGUS approach guys are very helpful. Restaurant cook will bake a pie for you while you eat lunch." Parameters 30*q* and 30*r* are two-letter identifiers of the departure and destination state, respectively, selected by a pilot user for the route he or she desires to share with other users. In the example embodiment, 30*q* and 30*r* is filled in with "IL" and "OH". Parameter 30*t* is an altitude, for example highest altitude of a route, selected by a pilot user for the route he or she desires to share with other users. In the example embodiment, 30*t* is filled in with a coded identifier "70" for an altitude of 7,000 feet above mean sea level. Parameter 30*u* is an additional database field to permit a pilot user to link still and/or moving pictures to the route he or she desires to share with other users. In the example embodiment, 30*u* a pilot user has used 30*u* to upload in inflight video and photos of the attraction for pilot users to view. In addition, box 30*i* is menu display of "All Routes" previously entered by pilot users, organized under menu items departure airports, destination airports, tail number, "NavFriend" pilot (a sample tradename selected for this example embodiment), and attraction, for Illinois in this example, wherein each menu item is selectable.

Figure 3:
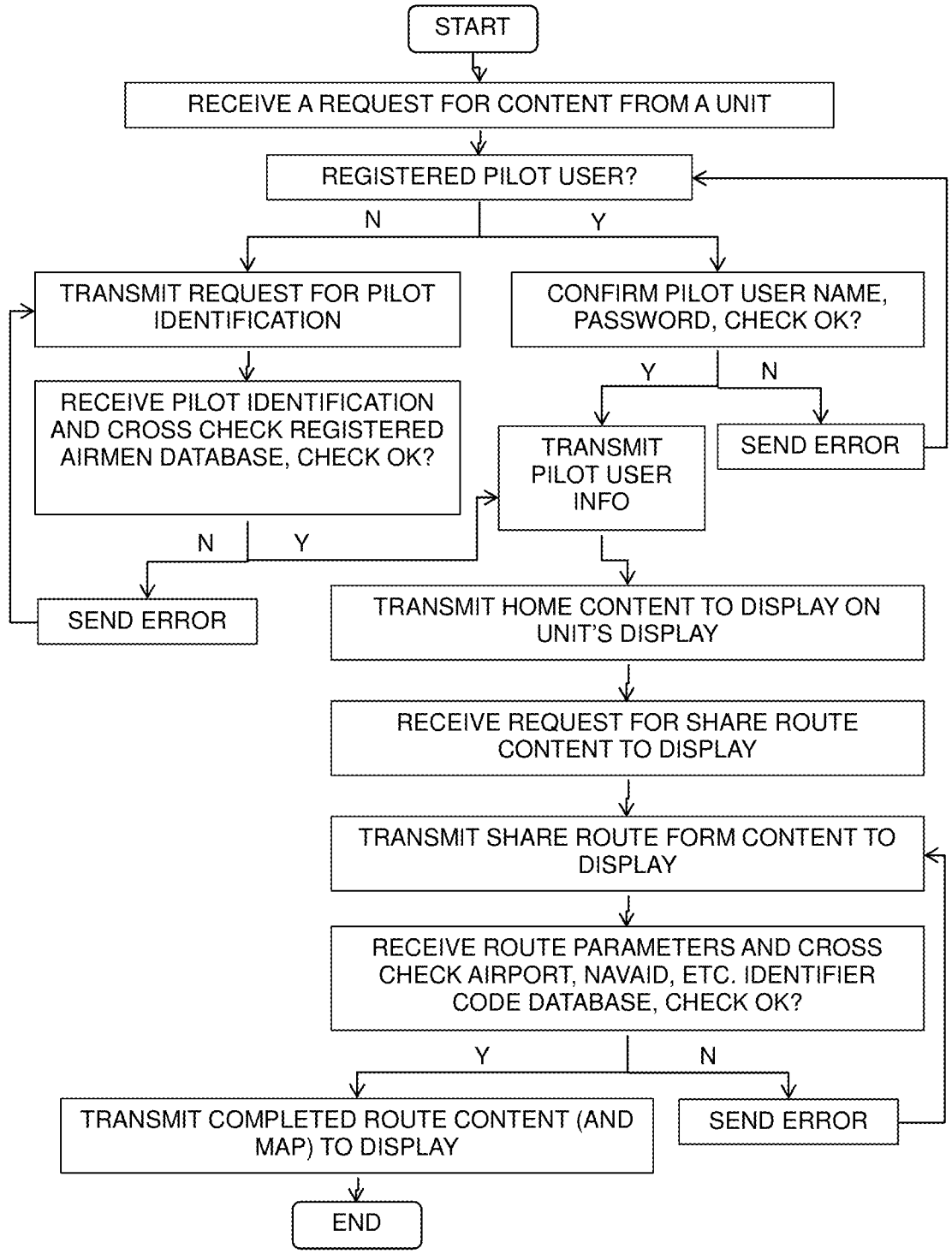
FIG. 3 illustrates a flow diagram for an example entry of route information by a pilot user.

FIG. 3 is a flow chart of an example entry of route information by a pilot user. Utilizing a unit 10 a pilot user transmits a request to a remote processing center to initiate use of an electronic system for sharing route information with other pilot users, in this example to enter information for a route to share with other users. A remote processing center receives request from a unit 10 and displays content for identifying the pilot user, which request may be accomplished in a single or multiple transmissions to and responses from a remote processing center. In the present example, a registered pilot user using a unit 10 transmits a request for content from a remote processing center, a remote processing center receives the request and causes a display to be transmitted to the unit 10, the registered pilot user enters identifying information which unit 10 transmits to a remote processing center which it receives and is checked by one or more database processers to confirm pilot user name, password. If a check fails, error content is sent to unit 10 for a user to reattempt identification. If a check passes, remote processing center transmits the pilot user's information, and if desired a pilot user's "home" content, to a unit 10 for display. Unit 10, for example, can display a pilot user's profile information, including name, aircraft type, aircraft tail number, a list of selectable IACO identifiers of departure and/or destination airports, a list of tail numbers, e.g., of friends' aircraft, favorite aircraft, aircraft flown, and/or a list of other pilot user friends. Unit 10 also can display popular routes for the day, week, month, six months, etc., airport use statistics, popular destination airports, attractions, departure airports, for the day, month, year, etc., pilot favorites, alerts for desired destinations or desired routes of a pilot user (for example requested via a navigation board), a pilot user's logbook of routes flown over a certain period of time or during the lifetime as a registered user, a message board, for example. Alerts or other timely or updated route, attraction or other information can be transmitted by push notification from a remote processing center, e.g., upon meeting certain pilot user conditions, or transmitted to a unit 10 in response to entry of a request for such type information, for example. In an alternative embodiment, a request for content from non-registered pilot user is transmitted from a unit 10 to a remote processing center which is received and causes a display to be transmitted to the unit 10, the non-registered pilot user enters a pilot registration number and identifying information such as a new username and password which unit 10 transmits to a remote processing center which it receives, and cross-checks the registration against one or more FAA (or a foreign registry if applicable) registered airmen databases to confirm the information transmitted from unit 10 in fact identifies an airman registered with a governmental authority. If the check fails, error content is sent to unit 10 for a user to reattempt identification. If the check passes, the new pilot user is entered into and organized into the one or more databases of database processor, and the remote processing center transmits the pilot user's information, and if desired a pilot user's home content, to a unit 10 for display. Remote processing center then receives a request from unit 10 for share route content to display, which is transmitted from a remote processing center to unit 10 to display. A pilot user then inputs data to complete a share route form display, for example as described for FIG. 2, which is transmitted from unit 10 to a remote processing center, which receives route parameters and cross checks information against known airport, navaid, waypoint, airway, and jetway codes, for example, to verify validity of transmitted codes for entry into a database of database processor. If not verified, remote processing center transmits error data or an error message to unit 10, and if verified, remote processing center transmits completed route content, e.g., confirmation of entry, and a map with completed waypoints, departure and destination to display to unit 10, in this example. As discussed elsewhere, information is entered, transferred, stored at a remote processing center, and information includes ICAO identifier, comments, hazards, etc., for example. It is noted that the foregoing requests to and transmissions of content from a remote processing center can each occur in one or multiple requests and transmissions, or fewer overall requests and transmissions may be utilized, or other means for accomplishing content requests and transmissions, as will be appreciated by those skilled in the art.

In the present example embodiment, by relying on pilot users' selective entry of desired route information for public viewing and discussion, rather than a system that indiscriminately gathers for display routes for all tracked flights, e.g., all IFR and/or VFR tracked flights, regardless of whether selected for sharing, from another government or commercial system while omitting other VFR flights, for example, allows for the building of a more selective and useful database of route information for other pilot users. This result in turn will encourage more useful data entry resulting in a more useful, more relevant and user friendly route information system for pilot users, for example. In addition to aspects of the present example that provides pilot users advantages in the way relevant route information is collected from pilot users, e.g., departure, destination and route information selected for entry and viewing by such pilot users rather than en masse collection for a database, another aspect of the present example allows a pilot user to access a database tailored either to his or her personal, e.g., local, preferences, while at the same time permitting a pilot user to discover and select new distant (or even nearby) airport destinations and/or attractions in a user friendly display interface. For example, to assist a pilot user is organization of a portal or displays to permit a pilot user access to a database of such route information as further explained in an example below.

Figure 4:
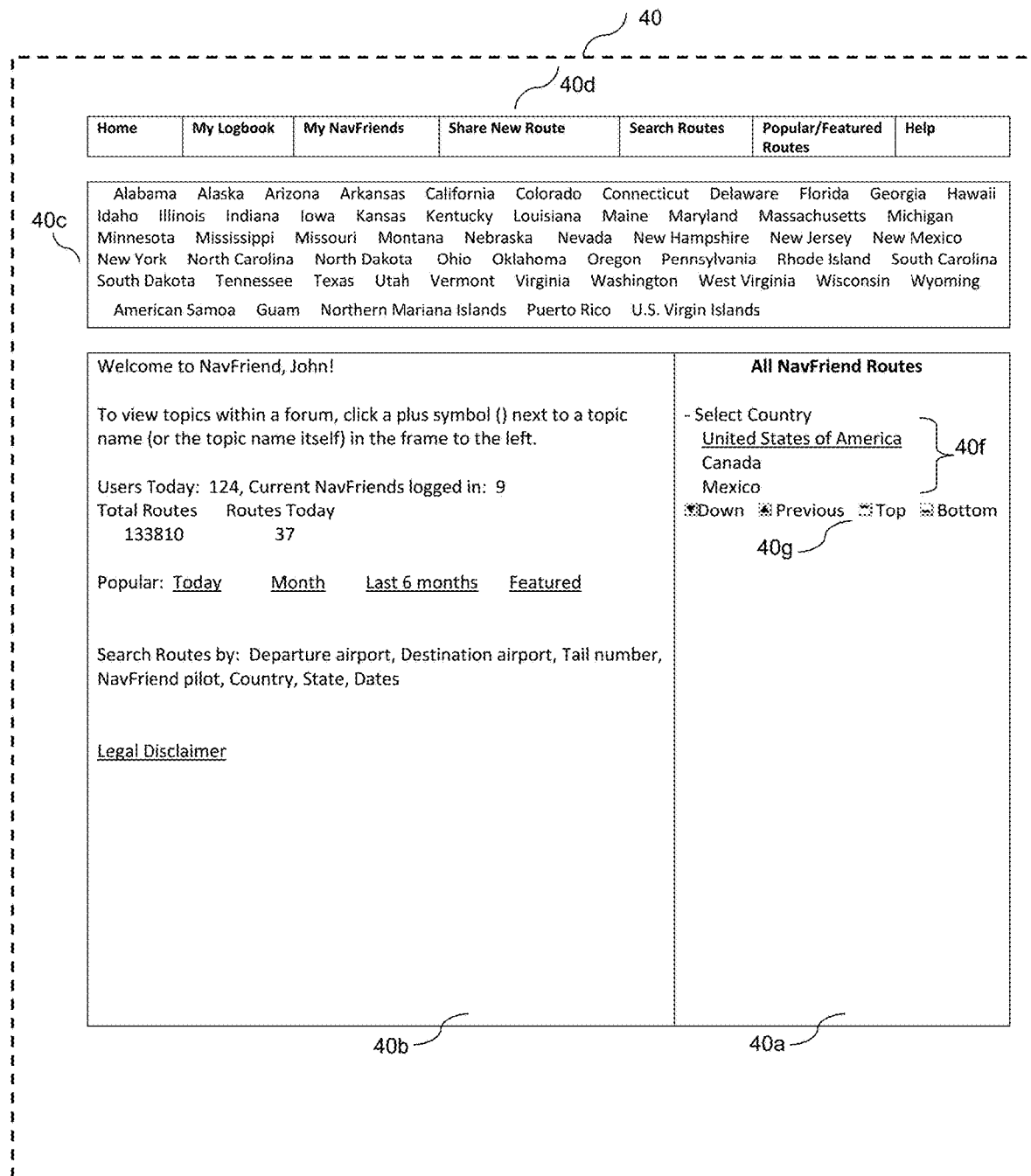
FIG. 4 illustrates a sample display of a unit for accessing information from a database of routes and linked information.
Figure 5:
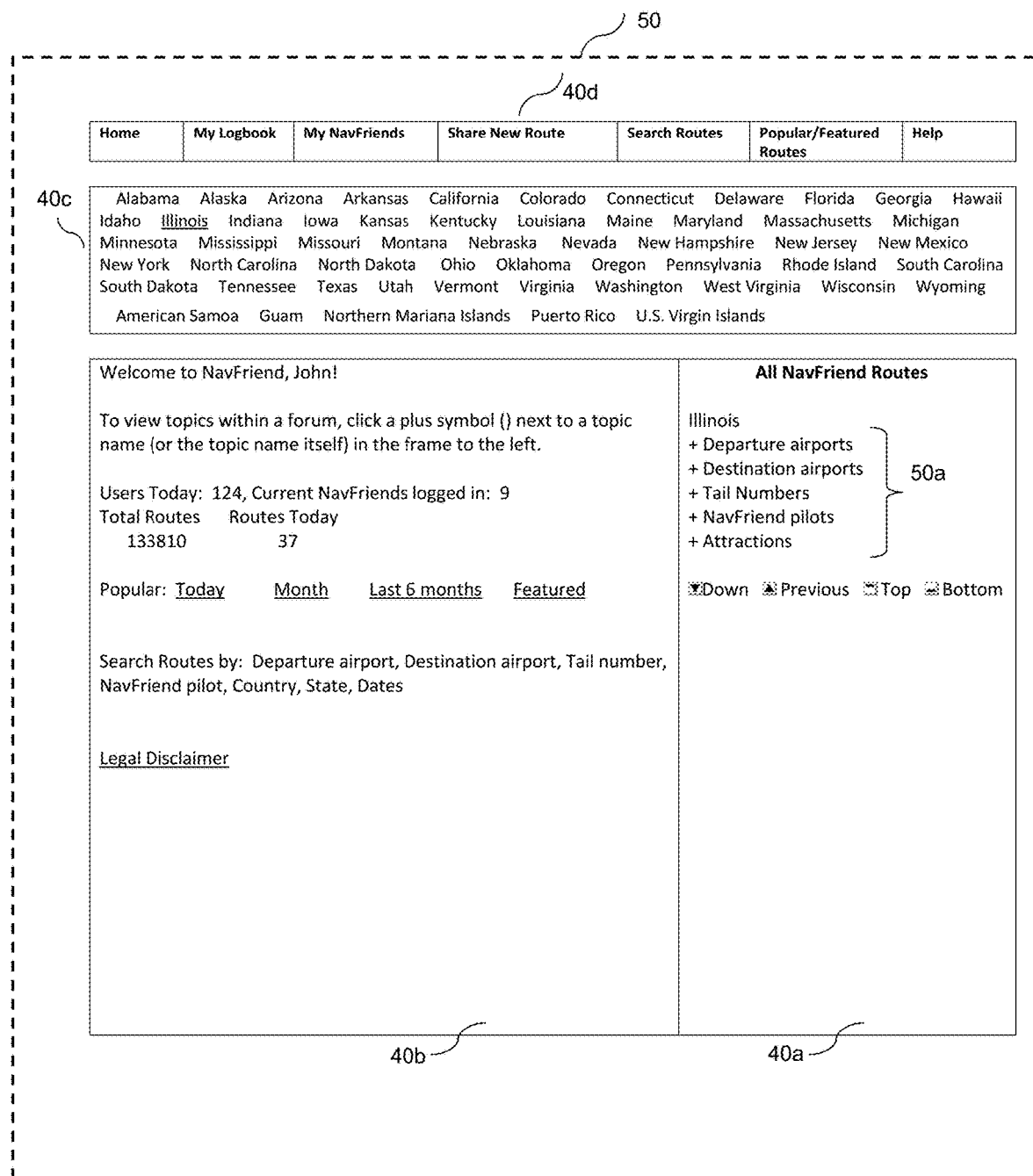
FIG. 5 illustrates a second sample display of a unit for accessing information from a database of routes and linked information.

FIGS. 4 and 5 are diagrammatic views of displays of a unit 10 for a pilot user to select desired information from an intelligent, e.g., an organized and relevant, database according to an example embodiment of the present invention. In an example of the present disclosure, selection can be organized by various selectable items: country, state, province, destination airports, departure airports, aircraft tail numbers, pilot user, and/or attraction, for example. Investigation and study of needed data for a pilot user and different ways to implement a useful display of database information indicate that certain items can present more user friendly starting points for selection than others. For example, according to the 2011-2015 National Plan of Integrated Airport Systems, released by the U.S. Department of Transportation and the Federal Aviation Administration, there were over 19,700 airports in the United States. Of these, 5,170 airports are open to the general public with 503 airports offering commercial service. The majority of public airports (2,829) are designated as reliever or general aviation airports versus commercial service. E.g., www.rita.dot.gov/bts/sites/rita.dot.gov.bts/files/publications/national_transportation_statistics/html/table_01_03.html. Listing all of these airports in a single display is not user friendly. Only those deemed relevant for selection by pilot users for entry of route information will become part of the database, or sub-database for example. For example, for the United States, there are far fewer states and territories than airports. From study and observation, it was determined that, contrary to the arrangement of prior art systems, most general aviation pilots originate flight planning from a "home" airport, and complete flights within the state of the home airport, or one or two states surrounding such state, for example. These pilots will be interested in their home airport, and other pilot friends, and not necessarily other airports as departure points, nor all other destination airports, for example. Pilots, however, desire to plan flights to new destinations, including destinations with attractions at distant airports, for example. These observations required study and investigation, and were not obvious without experimentation into different arrangements and layouts of FAA data types. The non-obviousness of these insights is evidenced by the failure of current systems to provide a user-friendly interface or display to select useful departure or destination information for a pilot, for example, despite commercial availability to pilots for multiple years. FIG. 4 depicts an another example display 40 for selectable countries including the United States with a display 40a of an easy to use menu of selectable items on one side, e.g., items 40f, and a welcome display 40b with selectable items on the other. Selectable items in this example include those shown in 40a and 40b, for example, with 40a displaying an easy to use menu for accessing routes from a remote processing center, e.g. 40f and associated items 40g, routes that have been selected for entry into a database at a remote processing center. Items 40g, for example, are utilized for scrolling through selectable items menu 40f, for example, in a manner as known to those skilled in the art, and such menu may be used in other displays. When the "United States of America" from 40f in display 40a is selected by a pilot user utilizing a unit 10, a menu of selectable states and territories 40c appears toward the top of the display, for example. Welcome display 40b includes selectable items for popular routes and featured routes, for example. Also included in 40b is an option to search for routes, e.g., using key words and/or Boolean operators in lieu of or in addition to use of the selectable menu items of display 40a, for example. Also included is a welcome message, identification of the pilot user, instructions on use of the menu 40a as will be known to those skilled in the art, a selectable item for a legal disclaimer, and statistics of routes entered into the database and number of pilot users currently using the system. Display 40b also can include a selectable menu item for a pilot user's other pilot users that he or she has included in a personalized list of aircraft and/or other pilots of which he or she wishes to keep informed.

Figure 6:
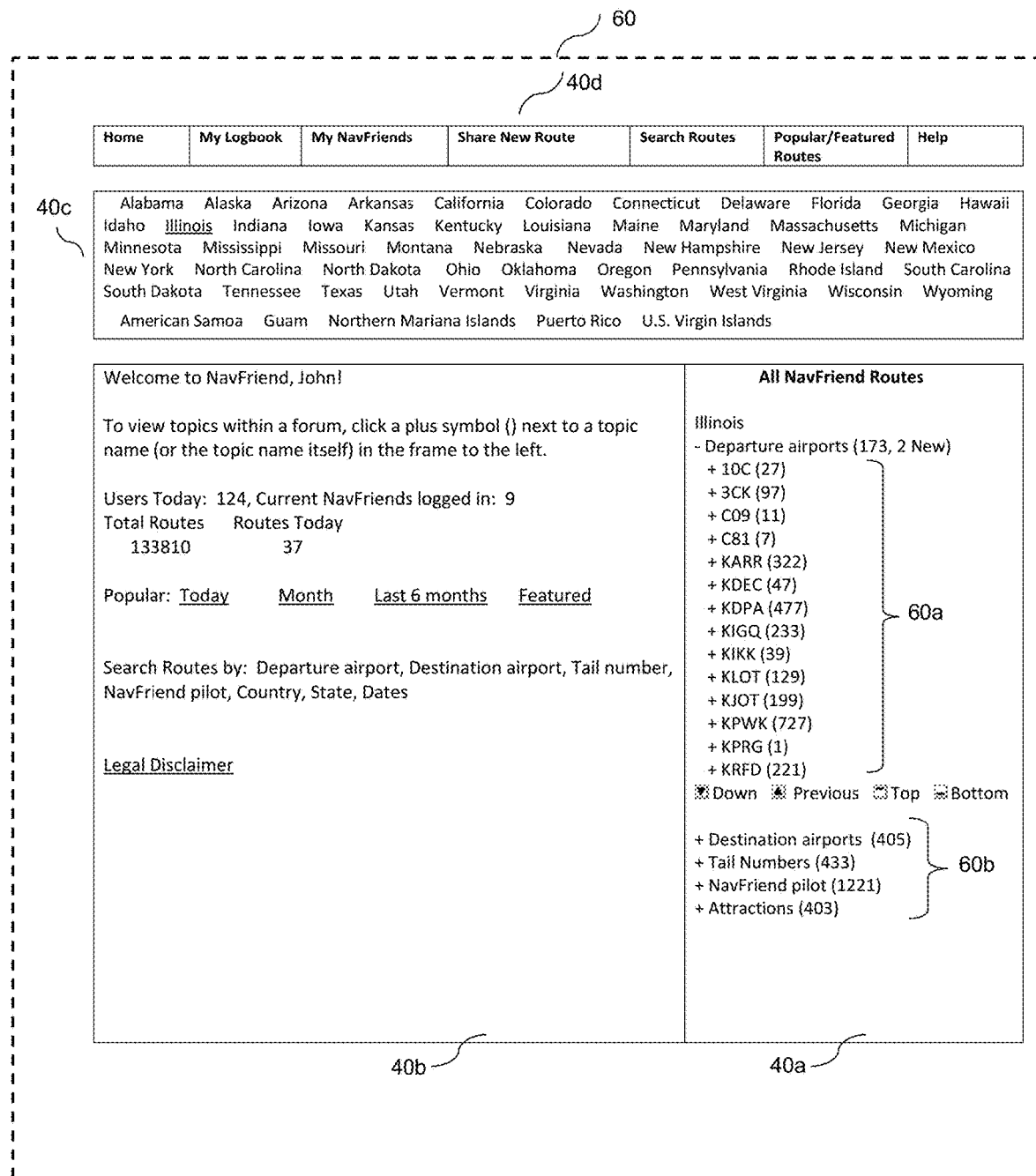
FIG. 6 illustrates a third sample display of a unit for accessing information from a database of routes and linked information.

FIG. 5 depicts an example display 50 of a unit 10 after a pilot user selects selectable menu item for Illinois in 40c. As shown in the example a menu of selectable items 50a is displayed. A selection of one of these selectable items can cause a list of pilot user routes to display according the name of the selectable item. The selectable item "Attractions," for example, can display a list of attractions such as restaurants or air shows, where an attraction is associated with a route entered by a pilot user and/or with a tail number, etc. A number next to the selectable item can indicate the number of available pilot user routes to view associated with each selectable item, for example "(405)" for Destination airports. The selectable item "Destination airports," or the other selectable items, may be limited to pilot user routes that are associated only with a particular higher menu item, e.g., only those in Illinois, or other parameter to make the selectable items more user friendly and ease searching of routes and other information. FIG. 6 depicts an example display of a unit 10 after a pilot user selects selectable menu item for departure airports from menu 50a below item Illinois. For all selectable items other forms of selection in other example embodiments may be utilized than those depicted in these example embodiments, for example drop down menus, text boxes, icons, radio buttons and/or dials, or a combination thereof. FIG. 6 shows menu 60a under "Departure airports" and still shows other menu items 60b. FIG. 6's departure airports are identified by FAA and/or IACO codes, for example, 10C, KPWK, etc., with a number of pilot user routes depicted next to a departure airport identifier code. Not all airports of Illinois are listed under the selectable item "Departure airports (173, 2 New)." Those departure airports that are included for selection, as with airports under other selectable menu items, are dependent on whether a pilot user has transmitted a route to database at remote processing center via telecommunications network for sharing with other pilot users, for example. In this manner, an easy to use, manageable menu or accessible list is available to a pilot user. Also, the number of departure airports, or other menu items, may be limited to one or a few to simplify user access to routes, e.g., if displayed on a small handheld device, such as a mobile phone. The destination airports, aircraft tail numbers, pilots, and attractions included in database for selection under selectable items 60b are dependent on whether a pilot user has transmitted a route to database at remote processing center via telecommunications network for sharing with other pilot users, for example.

FIG. 7 depicts an example display of a unit 10 after a pilot user selects selectable menu item for departure airport KPWK below item Departure airports. For example, a scrollable list 70a of available routes listed by name can be displayed. Available viewable routes, for example those displayed, have been selected for entry (and for viewing by other pilot users, e.g.) by pilot users and entered into a database at a remote processing center of an example embodiment system. Up and down controls 70b are displayed for route scrolling, for example, and airport "KPRG (1)" is still viewable along with associated up and down controls for departure airports. Also displayed are a number of notes, or message replies, of other pilot users commenting on a pilot user route, for example "(32 Notes)" next to "Airventure 2013." This feature permits interactive communication between pilot users to permit discussion of routes in database to assist a pilot's knowledge of a route and/or to permit social discussion of routes, if desired. Features or icons to permit real time visual, textual, and/or audio communication, messaging between users over telecommunications network can be integrated into a display 40, 50, 60, 70, etc. or in units 10. The number of routes or notes available from a given display can be limited if desired. For example, "Destination airports (405)" in 60b can be limited to destination airports in Illinois only, or to destination airports for routes departing from an airport in Illinois, or limited to destination airports departing from KPWK, e.g., once KPWK is selected, or combination thereof. In addition, another database retrieval feature may be incorporated into a display, for example display 70, where available routes can be filtered and/or displayed dependent on certain parameters relevant to a pilot user, such as by aircraft type (e.g., piston, twin, turbine, etc.), altitude, cruise speed, etc., for example. Also, a rating by users can be displayed, such as a number of stars to indicate, e.g., popularity of a route.

FIG. 8 depicts an example display of a unit 10 after a pilot user selects selectable item for "Great pie trip!" from menu 70a below item departure airport KPWK. The selectable item from menu 70a expands to show in display 40a, in this example, three entries for "Great pie trip!" and the identity of pilot user who entered the route, as well as comments and/or replies to a route and identity of pilot users who have made comments and/or replies, and related dates. FIG. 8 illustrates example content of a route available for viewing by a pilot user via searching for a route based on desired parameters, and/or via pilot user selection through selectable menu items, in this example user selection of the first entry for "Great pie trip!" A focus of FIG. 8's example display information is route data utilizing FAA coded identifiers. By building an intelligent database, this coded information can be used to correlate the actual route on a copy of an aviation map, for example an aviation map authorized for navigation, such as an FAA authorized VFR Sectional Chart, WAC, or IFR Low Airways Chart. Sample display 80 includes the example route drawn on a VFR Sectional Chart with course indicators. Selectable menu items can be included to permit display of alternative charts, e.g., a WAC, IFR low airways, World low, World high, etc. In an alternative embodiment, route graphics can be depicted in separate displays if desired. Displays are controllable, e.g., to allow enlarging, zooming or panning of an image. Additional map images, e.g., as thumbnail images, can be depicted in display 80, for example an additional image of the departure airport area and destination airport and area, respectively. In addition, route altitude and terrain data can be utilized to display the route on a three dimensional representation of the route and terrain enroute. Weather information, for example, satellite images, radar, METARs, ceiling, and other weather information, can be displayed as well, separately or along a desired route. The foregoing also can be displayed using a unit 10 via a three dimensional, e.g., holographic, view for ease of viewing. Also included and/or depicted can be airport FBOs, useful radio frequencies, for example by using the ICAO and/or FAA coded identifier to collect airport facility directory information. A number of times a route is viewed by pilot users also is displayed. In addition, ICAO codes can be received and processed by same or another remote processing center to generate a route or course line on a chart such as a VFR sectional chart. The route or course line is available for viewing by the user or pilot who entered the navigation information and by other users or pilot users.

FIG. 8 depicts the route, comments, etc. entered by a pilot user; however, comments and/or replies of other pilot users can also be accessed via display 80, for example, by scrolling display 40b to reveal replies and/or comments on a route that are entered by pilot users after entry of the route in a database. If desired, the route and replies may be presented on one display. A pilot user's route for a day's flight can be linked to one or more messages of that pilot user. For example, after a pilot user enters a route utilizing a unit 10 and telecommunications network transmitting to database at a remote processing center, database processor is arranged to transmit a message, e.g., an alert, via telecommunications network, to one or more units 10 to notify a pilot user that a route is available for viewing. Such alerts can be arranged for transmission based on whether a pilot user has selected this option e.g., in response to a wish list or query about a destination or route or in connection with a list of pilot user friends, or selected for a pilot user. The pilot user's route is also linked to the pilot's profile. ICAO codes selected by the pilot or user can be received and processed by same or another remote processing center to generate a route or course line on a chart such as a VFR sectional chart in electronic form. Such a system creates a useful and interactive means for a group of pilots to each collect route, waypoint, information about a personal flight, transfer such information to a remote processing center, have such information be processed to allow linking of information to a route, have such information be processed to allow a graphical display of such route which is linked to such route and the profile of the pilot that provided the route information, store such information, allow other pilots to access such route information, and allow other pilots to comment on such route information. To avoid overloading the available selectable items associate with routes for a pilot user, an example system can limit menu results from a database, for example, to a period of time, e.g., a day, week, six months, one year, two years, etc., or a number of routes, or narrow search results. In addition, as depicted in menu 40d, a pilot user can access a pilot user's personal logbook that presents a display to access routes, for example all routes, entered by a pilot user into a database at a remote processing center utilizing a unit 10. If desired, a database may be additionally organized to permit a pilot user to access other pilot users' route, flight, and/or logbook, etc. utilizing a unit 10, for example via a selectable item "My NavFriends" in menu 40d, e.g., along with alerts. Also displayed in display 40b is a group of selectable items 80b for a pilot user to access additional features of a database accessible from a remote processing center. COMMENT allows a pilot user to submit a public comment to a route or related information. RATE allows a pilot user to rate a route and/or attraction based on personal, subjective, or objective parameters. FLAG allows a pilot user to designate a route for special attention, e.g., for viewing at a later time. A list of such routes could be created for a pilot user. WISH LIST allows a pilot user to create a query regarding one or more desired routes by a pilot user, where the one or more queries is publicly available for comment and/or reply by other pilot users and/or to request posting of, e.g. of a flown route by another pilot user. COPY allows a pilot user to copy a route, and related information if desired, to another program or the same or another unit 10, or to a personal computing device. BRIEF allows a pilot user to obtain a weather briefing, e.g., FAA standard brief, for a route. REPLY allows a pilot user to submit a reply to a route in database, e.g., to submit comments, questions, or supplemental information in connection with a route. SHARE allows a pilot user to select an option to share his or her routes with other pilot users, e.g., via alerts. HAZARD allows a pilot user to view potential flight hazards along a route and/or to identify additional hazards. NAVFRIENDS allows a pilot user to view a list of other pilot users he or she desires to share routes and/or view routes. FILE allows a pilot user to file a route as part of a flight plan with a governmental agency, e.g., the FAA. Relatedly, a route can be exported to another electronic system for use by that system, e.g., ForeFlight, and then if desired filing with a governmental agency such as the FAA. TFR/OVERLAY allows a pilot user to display on the same or different display TFRs on a chart with route. PERSONAL MESSAGE allows a pilot user to send a non-public message to another pilot user, e.g., via text, video, photo, email, vmail, etc. SOCIAL MEDIA POST allows a pilot user to link his or her route information, e.g., moving, still pictures, etc. to a social media system such as Facebook, Twitter, or Instagram. AMEND/ADD/UPDATE allows a pilot user to update and correct a previously transmitted route and related information. AFD allows a pilot user to retrieve information found in a government authorized Airport Facility Directory, such as control tower and other frequencies, runway data, FBO information, etc. WEATHER/OVERLAY allows a pilot user to overlay weather information, e.g., radar, winds aloft, cloud cover, ceiling, temperatures, AIRMETS, SIGMENTS, etc. NOTAMS allows a pilot user to display FAA notices to airmen, etc. Display 80 also includes selectable items 80*c*, in this example PHOTOS, NAVFRIEND PILOT PROFILE, PILOT, and AIRCRAFT.

Example embodiments of the present disclosure, with arranged displays, selectable items, and database, for example, allows for a compact, easy to use system, and unlike any known prior art system the disclosure concerns a database created, e.g., by selective input of routes by other pilot user that are publicly accessible on a local unit of a pilot user. Pilot users want to know who is flying from his or her home airport, and to what interesting destinations other pilots are flying. Example embodiments of the present disclosure, for example, utilizes flight plan information entered by pilots for viewing, discussion, and comment by other pilots and pilot user comments on route, attraction, etc. linked to a single display session, and unlike any known prior art system is organized in a useful way, for example, a request for flights from or to an airport will not indiscriminately show every filed and activated IFR flight plans for that airport. Also, example embodiments permit sorting of routes and display of routes based on pilot identification, and do not require a user to be permitted by the FAA to file IFR plans on behalf of a pilot. Example embodiments are directed to informing pilot users of destinations, attractions, or encouraging pilot users to share route information for discussion and review by other pilot users. In example embodiments of the present disclosure routes also may be organized by most recent entry or, e.g., in alphanumeric order. Pilot users may move back and forth between displays. Pilot users may cross reference routes with other routes. Displays of example embodiments may require scrolling to be visible on one display interface, e.g., of a compact device such as a mobile telephone. For example, on a compact device at least top portion of an All NavFriend Routes menu will remain displayed while a route and related information are viewed in an adjacent display. In example embodiments other pilot users can: 1) view routes, 2) can comment on other pilot user routes or respond to comments on their own routes entered for sharing, 3) can communicate with other user pilots, reply to comments, etc., and 4) pilot users can rate entered routes. In example embodiments, in addition to or in lieu of selectable items menus, a user can also search by destination airport and departure airport, or other parameters such as tail number, pilot identification, attraction, etc., via key word, code, Boolean, or other search features. In addition, in example embodiments routes may be organized by profile information of pilot user, such as home airport of pilot, pilot certificate or rating of pilot, e.g., commercial, instrument rating, tail wheel, single-engine-land, category and class of aircraft. It is noted that reference to the tradename "NavFriend" in this disclosure should not be read to be limiting the present disclosure, invention, or claims to any commercial embodiment later implemented.

Figure 9:
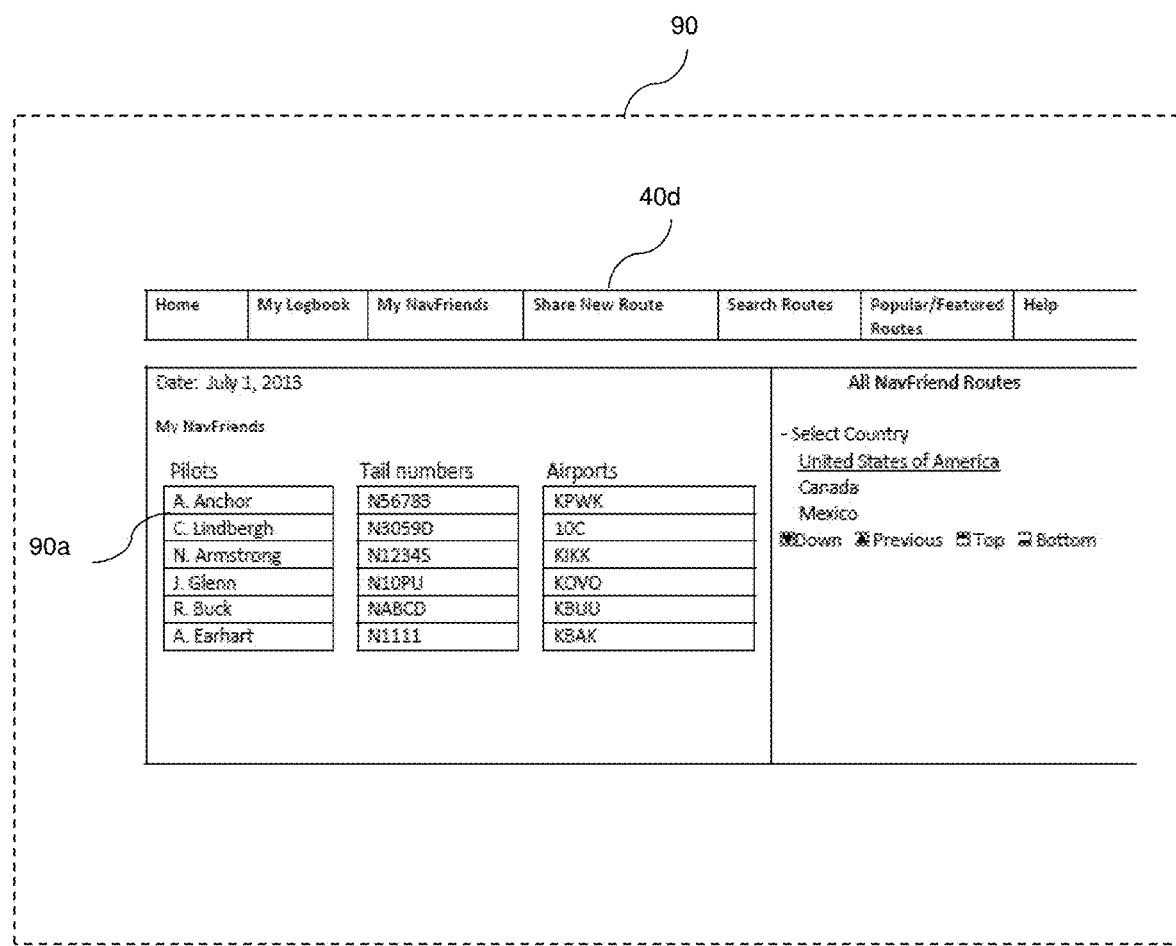
FIG. 9 illustrates a sixth sample display of a unit for accessing information from a database of routes and linked information.

FIG. 9 depicts an example display of a unit 10. A remote processing center has information relating to multiple users or pilots who have transferred profile information to a remote processing center via one or more units 10 and a telecommunications network. Profile information of a pilot user includes, for example, pilot's name, pilot's home airport, and one or more tail numbers associated with a pilot user. Display 90 shows an example display after a pilot user selects "My NavFriends" in menu of selectable items 40*d*, where transmitted from remote processing center is a list of pilots, which is a subset of pilots in database of database processor at remote processing center, for example. Likewise, in display 90*a* is a list of tail numbers and airports, which is a subset of tail numbers and airports, respectively, in database of database processor at remote processing center, for example. Pilot users, for example, can determine what items will display in display 90*a* based on selection of certain parameters. For example, a pilot user can invite other pilot users to be displayed on his or her unit 10, or be invited to join another pilot user's "My NavFriends" menu. Associated data parameters, such as tail number and airport, can be linked with a pilot name when selected, or other data parameters displayed, such as tail numbers or airports, can be independent and selected separately for display along with another parameter such as a pilot's name. In other embodiments directed to other types of selectable items, items selected for display 90, e.g., automobile owner, owner's home, plate number, can be similarly selected for display. The disclosure and structures of the present invention and example embodiments can be directed to and use as substitutes selectable items including any association along the lines of person, equipment operated, equipment identification, home location, and/or area of operation, for example, biker, bicycle identification, home, area or route of use parameters, or mobile phone user, phone identification, home, area or route of use parameters, etc.

Although the present disclosure and its advantages have been described in detail, it should be understood that various changes, substitutions, additions, and alterations can be made herein without departing from the spirit and scope of the present disclosure, and/or as defined by the appended claims. As one of ordinary skill in the art will readily appreciate from the disclosure of the present disclosure, manufacture, systems, apparatus, processes, steps, devices, or means presently existing or later to be developed that perform substantially the same function or achieve substantially the same result as the corresponding embodiments described herein may be utilized according to the present disclosure. Accordingly, one or more of the appended claims can include within their scope such systems, apparatus, processes, steps, devices, or means.

The invention claimed is:

1. An electronic system comprising: a plurality of handheld portable data entry units; and one or more remote processing centers, a center of said one or more centers of the electronic system also comprising:
   (a) a network interface configured to connect, via a telecommunications network, a center to communicate with a handheld portable data entry unit of said plurality of portable units; said portable unit including: (i) one or more input sensors, (ii) a wireless communications interface, and (iii) a display screen; said portable unit programmed to submit a flight plan in electronic form for filing with an aviation authority service on behalf of a pilot user associated with said portable unit;
   (b) a database processor and computer storage;
   (c) a database of information, and of user selectable flight routes built via one or more said database processors utilizing data transmitted to the center via one or more of said plurality of portable units; wherein the center is configured:
      (i) to receive for the center's database from a portable unit of said plurality of portable units a set of data for a flight route which utilizes a plurality of codes; and (ii) to store a flight route, corresponding to the set of data, linked to an identity of a user, which identity is associated with a portable unit of said plurality of portable units; wherein (iii) the set of data for a flight route comprises at least: a departure for the route; a destination for the flight route; one or more intermediate waypoints between the departure and the destination, in the event the flight route includes said one or more waypoints; an altitude for the flight route; and an aircraft tail number; and wherein (iv) each code of said plurality of codes represents an airport, a navigation aid, a reporting point, an airway, a predetermined route, or a waypoint utilized for air navigation; wherein (d) utilizing data for flight routes of the database of a center, a center of said one or more centers is configured to transmit for reception via a wireless communication to a portable unit of said plurality of portable units, data for a plurality of user selectable flight routes; wherein the receptive portable unit is programmed:

(i) to display, in response to user input to the receptive portable unit, a listing of user selectable flight routes of said plurality of user selectable flight routes, wherein: the listing includes multiple destinations or departures; and (ii) to display a graphical depiction of a route or course line corresponded to codes utilized for a flight route, displayed after selection via the receptive portable unit, of a user selectable flight route from the listing; and (iii) to submit an electronic flight plan via the system for filing with an aviation authority service, via utilizing: a selectable menu item named as or labeled as a feature allowing a user to file a flight plan; and data for a route of said plurality of user selectable flight routes; wherein (e) the receptive portable unit also is programmed to receive: content for a new user selectable flight route, shared via another portable unit of said plurality of portable units, which new route was linked to an electronic message; and identity data linked to the new route; wherein (i) the linked identity data includes a name or characters;

(ii) the receptive portable unit is programmed wherein: the new user selectable flight route is delivered to the receptive portable unit to display via a feature or menu configured to list a listing of user selectable flight routes; is selectable from said listing via one or more of the receptive portable unit's input sensors; is displayed in said listing along with linked identity data indicating who shared the new route; and is displayed along with at least a representative code for location of the new route's departure;

(iii) the receptive portable unit is programmed to display said linked message as a notification that a new user selectable flight route is being shared, previous to a display of the new user selectable flight route within said listing on the receptive portable unit's screen;

(iv) said another portable unit is programmed to display a selectable menu item in a display on its screen, said menu item named as or labeled as a feature allowing a user of said another portable unit to select an option to share a flight route; and (v) said another portable unit is programmed to permit a user to update content of a flight route previously shared, and received by the receptive portable unit; and in the event of said update, a center of said one or more centers is configured to transmit to the receptive portable unit updated route information to update the previously shared user selectable flight route linked to the identity data;

(f) wherein further, the receptive portable unit is in a form of a tablet computer or mobile telephone device with a touchscreen interface comprised of its screen and one or more of its input sensors; and wherein, in the event permitted via personal identifying data of a user associated with the receptive portable unit, a center of said one or more centers is configured to transmit content, for reception via a wireless communication to the receptive portable unit, wherein the content includes map data which includes terrain data; and wherein the receptive portable unit is programmed to display in response to user input via the receptive portable unit:

(i) route graphics of a route utilized for flight planning which include a three dimensional representation of: a route of a user selectable flight route of the database of a center, and terrain features of land found along the route; via utilizing altitude data of the user selectable flight route and the map data; and (ii) in addition to the display of said three dimensional representation on its screen of said route and of said terrain features, to display on its screen a three dimensional representation of weather information along said route.

2. The electronic system according to claim 1, wherein a said airport, navigation aid, reporting point, airway, predetermined route, or waypoint includes any respective airport, navigation aid, reporting point, airway, predetermined route, or waypoint which is valid or acceptable by an international or governmental aviation authority for insertion in completing or filing a flight plan; and wherein: (i) in the event the flight route includes said one or more intermediate waypoints, one or more of said one or more intermediate waypoints is an airport, a reporting point, a navaid, or any waypoint with a representative code for location; and/or (ii) said set of data of a flight route additionally comprises one or more predetermined routes or airways between the departure and the destination, in the event the flight route includes one or more predetermined routes or airways, wherein said one or more predetermined routes or airways each includes a location identifier or a representative code.

3. The electronic system according to claim 1, wherein: a center of said one or more centers is configured to permit administrator access to use the system to administer, control, maintain, or correct one or more databases via a communications network or via direct access to a database processor.

4. The electronic system according to claim 1, wherein: (i) said one or more centers comprises a computer, a plurality of computers at one or more physical locations, farms of computers, a single proprietary system, or a storage area network; (ii) the database of a center is: a database distributed among multiple data processors and/or computers; one of multiple databases; one of multiple databases wherein one or more of the multiple databases are located in one or more other centers of said one or more centers; a database which is a subset of a database; made of one or more sub-databases; or a database stored in a storage area network; and (iii) login information is stored for later use to access content of the system via a portable unit of said plurality of portable units.

5. The electronic system according to claim 1, wherein: (i) a portable unit of said plurality of portable data entry units is programmed to display in response to user input to the unit another listing, wherein said another listing includes multiple destinations or departures, and all routes of said another listing are limited to corresponding to a same aircraft tail number identifier common to each route in said another listing, and said another listing is displayed along with said common tail number identifier; and (ii) a said listing corresponding to a same airport identifier code and a said another listing corresponding with a same aircraft tail number identifier are displayed together for viewing or separately for viewing.

6. The electronic system according to claim 1, wherein a said airport is a heliport or other landing area or landing facility.

7. The electronic system according to claim 1, wherein said transmission to the receptive portable unit of updated route information via said one or more centers utilizes push technology.

8. The electronic system according to claim 1, wherein the portable unit is configured to allow a user to overlay weather information in the form of radar for a flight route on its display screen.

9. The electronic system according to claim 1, wherein the portable unit includes a GPS radio chipset and related antenna.

10. The electronic system according to claim 1, wherein, of the receptive portable unit and of said another portable unit which is separate from the receptive portable unit: the receptive portable unit is also a said portable unit of said plurality of portable units from which a center of said one or more centers receives a said set of data for a flight route; or said another portable unit also is a said portable unit of said plurality of portable units from which a center of said one or more centers receives a said set of data for a flight route; or wherein the receptive portable unit and said another portable unit is each also a said portable unit of said plurality of portable units from which a center of said one or more centers receives a said set of data for a flight route.

11. An electronic system comprising:
(a) a plurality of portable units; wherein
(b) each portable unit of said plurality of portable units: has a wireless communications interface, input sensors, and a display screen; is a tablet computer or a mobile telephone device with a touchscreen interface comprised of its screen and one or more of its input sensors; and is programmed: to permit access to an electronic logbook of routes flown; and to communicate with one or more remote processing centers; and wherein
(c) a portable unit of said plurality of portable units is programmed to communicate with a center of said one or more centers which includes a database of user selectable flight routes built utilizing data received by the database via a network, including data transmitted to the center from said portable unit; wherein said portable unit is programmed:
 (i) to transmit to the center a set of data for a flight route; wherein said set of data is for reception by the database to store a flight route, corresponding to the set of data, linked to a user identity; wherein
 (ii) the set of data for a flight route contains at least: a departure for the flight route; a destination for the flight route; one or more intermediate waypoints between the departure and the destination, in the event the flight route includes said one or more intermediate waypoints; an altitude for the flight route; and an aircraft tail number; and wherein
 (iv) the departure, the destination, and each waypoint of said one or more intermediate waypoints in the event included, is each represented by a code of a plurality of codes utilized for air navigation; and further wherein
(d) a receptive portable unit of said plurality of portable units is programmed to permit transmission of a user identity for a login utilized by said one or more centers; and wherein, utilizing data received by the database transmitted by said portable unit, the receptive portable unit is programed:
 (i) to receive from a center of said one or more centers at least one user selectable flight route; and
 (ii) to permit display of said at least one user selectable flight route in a list of user selectable flight routes, via a menu display or feature configured to display a list of user selectable flight routes; wherein said menu display or feature is additionally configured: to display, in response to user input, a list of user selectable flight routes filtered dependent on a search parameter representative of an aircraft tail number; and to display, in response to user input, a list of user selectable flight routes filtered dependent on a search parameter representative of an airport; and
(e) another portable unit of said plurality of portable units is programmed to permit transmission of another user identity (different from said user identity for said login) for another login utilized by said one or more centers; wherein utilizing a database of logbook information of a center of said one or more centers, the receptive portable unit is programmed to access via said login shared logbook information of a route flown; wherein said shared logbook information is linked to said another user identity and an electronic message, and is shared via a feature or menu of said another portable unit configured to permit sharing of flight information with one or more pilot users; and wherein the receptive portable unit is programmed:
 (i) to permit display on its screen: of said message as an indication of logbook information being shared; and a display of a name or characters of or associated with said another user identity data to indicate who shared the shared logbook information; and
 (ii) to permit display on its screen of said shared logbook information, via a feature or menu configured to display an electronic logbook of routes flown; and wherein
(f) utilizing data for attractions of a database of a center of said one or more centers, the receptive portable unit is programmed to access, via said login, attractions for a pilot; wherein the receptive portable unit is programmed:
 (i) to permit display, via a feature or menu of the receptive portable unit configured to display a list of attractions on its screen, of a list of user selectable attractions, wherein: said list of attractions includes multiple destinations; and each said user selectable attraction of said list of attractions is selectable via the receptive portable unit's touchscreen interface;
 (ii) to permit display on its screen of a destination on an electronic map corresponding to an attraction of said list of attractions; and (iii) in the event one or more electronic photos correspond to an attraction of said list of attractions, to permit display on its screen of said one or more photos; and wherein (g) the receptive portable unit is programmed to receive from a center of said one or more centers, content which includes terrain data utilized for air navigation; and wherein the receptive portable unit is programmed to permit display:

(i) of a three dimensional representation on the receptive data entry unit's screen: of a route drawn of a user selectable flight route; and of terrain along the route drawn; via utilizing: the terrain data; and altitude data of the user selectable flight route; and (ii) in addition to display of said three dimensional representation of the route drawn and of said terrain along the route drawn on the receptive data entry unit's screen, a display of a three dimensional representation of weather information along the route drawn.

12. The electronic system according to claim 11, wherein: (i) said one or more centers comprises a computer, a plurality of computers at one or more physical locations, farms of computers, a single proprietary system, or a storage area network; (ii) the database of a center of said one or more centers also: is a database distributed among one or more other centers of said one or more centers, including among multiple data processors and/or computers; is one of multiple databases, wherein one or more of the multiple databases is located in one or more other centers of said one or more centers; is a database which is a subset of a database; is made of one or more sub-databases; or is a database stored in a storage area network.

13. The electronic system according to claim 11, wherein: said plurality of codes utilized for air navigation includes one or more of: an ICAO code utilized for air navigation, an ICAO identifier, an FAA identifier, a navaid identifier, a navigation aid identifier, a location identifier, a code of a landing facility or other airport, a code of a waypoint, a code of a station, a code of a point, a code of a location, a code utilized for an approach procedure, a code of a predetermined route (including of a victor airway, jet airway, color airway, approach procedure, or other predetermined route), a code of a point or a waypoint of a predetermined route, a code utilized for a VFR or IFR flight plan, a code utilized for air traffic control routing, a code for location on a VFR sectional, WAC airway, or IFR airway map, or other symbolic, alphabetic or alphanumeric code representative of a location, or of a route, which is utilized for air navigation.

14. The electronic system according to claim 11, wherein, of the receptive portable unit and of said another portable unit which is separate from the receptive portable unit: the receptive portable unit is also a said portable unit of said plurality of portable programmed to transmit a said set of data for a flight route to a center of said one or more centers; or said another portable unit also is a said portable unit of said plurality of portable units programmed to transmit a said set of data for a flight route to a center of said one or more centers; or wherein the receptive portable unit and said another portable unit is each also a said portable unit of said plurality of portable units programmed to transmit a said set of data for a flight route to a center of said one or more centers; and wherein said another portable unit also is programmed: to receive from a center of said one or more centers at least one user selectable flight route.

15. An electronic system including one or more remote processing centers, a center of said one or more centers of the electronic system comprising:

(a) a network interface configured to permit communication via a network with: a data entry unit which includes input sensors, a wireless communications interface, and a display screen;

(b) computer storage, and one or more database processors; and (c) a database including user selectable flight routes, built utilizing data received for the database, including data received by the system via a network from at least one of a plurality of said data entry units; wherein the center is configured:

(i) to receive for the database: a set of data for a flight route from a data entry unit of said plurality of data entry units; and (ii) to store a flight route, corresponding to the set of data, linked to a user identity; wherein (iii) the set of data for a flight route contains at least: a departure for the flight route; a destination for the flight route; one or more intermediate waypoints between the departure and the destination, in the event the flight route includes said one or more intermediate waypoints; and an altitude for the flight route; and wherein (iv) the departure, the destination, and each waypoint of said one or more intermediate waypoints in the event included, is each represented by a code of a plurality of codes utilized for air navigation; and wherein (d) a center of said one or more centers is configured: to receive a user identity for a login to the system; and wherein a center of said one or more centers is configured: utilizing data received by the system from said at least one data entry unit for the database, to deliver one or more user selectable flight routes, for reception to a data entry unit of said plurality of data entry units, wherein the receptive data entry unit is in a form of a tablet computer or mobile telephone device with a touchscreen interface comprised of its screen and one or more of its input sensors; and wherein (i) said user identity received for said login to the system: is from the receptive data entry unit; and (ii) said one or more user selectable flight routes is delivered by a center of said one or more centers to display within a menu display or feature of the receptive portable unit dedicated to displaying a list of user selectable flight routes on its screen; and wherein further (e) a center of said one or more centers is configured: to deliver content via said login for reception to the receptive data entry unit, wherein the content includes: terrain data utilized for air navigation; and wherein a center of said one or more centers also is configured to deliver weather data for reception to the receptive data entry unit; wherein:

(i) the terrain data is delivered by a center of said one or more centers to permit a display on the receptive data entry unit's screen of a three dimensional representation: of a route drawn of a user selectable flight route; and of terrain along the route drawn; via utilizing: the terrain data; and altitude data of the user selectable flight route; and (ii) the weather data is delivered by a center of said one or more centers to permit, in addition to display of said three dimensional representation of the route drawn and of said terrain along the route drawn on the receptive data entry unit's screen, a display of a three dimensional representation of weather information along the route drawn; and wherein (f) a center of said one or more centers is configured: to receive another user identity (different from said user identity for said login) from another data entry unit of said plurality of data entry units; and wherein a center of said one or more centers is configured: in response to a selection via said receptive data entry unit, to deliver via said login for reception to the receptive data entry unit: a shared user selectable flight route linked to said another user identity, and data including a name or characters of or associated with said another user identity; wherein:

(i) said shared flight route and said data including a name or characters is delivered by a center of said one or more centers to display said shared flight route, along with said name or characters to indicate who shared said shared flight route, in a list of user selectable flight routes within said menu display or feature of the receptive data entry unit; and wherein (ii) in the event of a reception by a database of a center of said one or more centers of an update of information of said shared flight route linked to said another user identity, a center of said one or more centers is configured to transmit to the receptive data entry unit updated route information to update said shared flight route previously shared and displayed within said menu display or feature.

16. The electronic system according to claim 15, wherein: a center of said one or more centers is configured to permit administrator access to use the system to administer, control, maintain, or correct one or more databases via a communications network or via direct access to a database processor.

17. The electronic system according to claim 15, wherein: said data entry unit which includes input sensors, a wireless communications interface, and a display screen is: a desktop computer, laptop computer, tablet computer or mobile telephone device; and wherein: (i) said one or more centers comprises a computer, a plurality of computers at one or more physical locations, farms of computers, a single proprietary system, or a storage area network; and (ii) the database of a center of said one or more centers also: is a database distributed among one or more other centers of said one or more centers, including among multiple computers and/or data processors; is one of multiple databases, wherein one or more of the multiple databases is located in one or more other centers of said one or more centers; is a database which is a subset of a database; is made of one or more sub-databases; or is a database stored in a storage area network.

18. The electronic system according to claim 15, wherein, of the receptive portable unit and of said another portable unit which is separate from the receptive portable unit: the receptive portable unit is also a said portable unit of said plurality of portable units from which the database receives a said set of data for a flight route; or said another portable unit also is a said portable unit of said plurality of portable units from which the database receives a said set of data for a flight route; or wherein the receptive portable unit and said another portable unit is each also a said portable unit of said plurality of portable units from which the database receives a said set of data for a flight route; and wherein said another portable unit also is programmed: to receive from a center of said one or more centers one or more user selectable flight route;

and wherein a center of said one or more centers being configured to deliver via said login said one or more user selectable flight routes for reception to the receptive data entry unit: is in response to user entry or selection via the receptive portable unit of a request to receive data for flight routes from the system; or is in response to user selection via the receptive portable unit of one or more user conditions to receive data for flight routes from the system.

19. The electronic system according to claim 15, wherein: (i) in the event the flight route includes said one or more intermediate waypoints, one or more of said one or more waypoints is an airport, a reporting point, a navaid, a waypoint, or a point of a predetermined route; and wherein (ii) said set of data of a flight route additionally contains one or more airways or predetermined routes between the departure and the destination, in the event the flight route includes one or more airways or predetermined routes for the flight route, wherein each of said one or more airways or predetermined routes is represented by a code of said plurality of codes utilized for air navigation; and wherein said plurality of codes utilized for air navigation includes one or more of: an ICAO code utilized for air navigation, an ICAO identifier, an FAA identifier, a navaid identifier, a navigation aid identifier, a location identifier, a code of a landing facility or other airport, a code of a waypoint, a code of a station, a code of a point, a code of a location, a code utilized for an approach procedure, a code of a predetermined route (including of a victor airway, jet airway, color airway, approach procedure, or other predetermined route), a code of a point or a waypoint of a predetermined route, a code utilized for a VFR or IFR flight plan, a code utilized for air traffic control routing, a code for location on a VFR sectional, WAC airway, or IFR airway map, or other symbolic, alphabetic or alphanumeric code representative of a location, or of a route, which is utilized for air navigation.

20. The electronic system according to claim 15, wherein: a center of said one or more centers additionally comprising a database including attractions information for a pilot, wherein utilizing data of a database including attractions information for a pilot, a center of said one or more centers is configured to deliver, for reception to the receptive portable unit, a plurality of attractions; and wherein (i) said plurality of attractions is delivered by a center of said one or more centers to permit display within a feature or menu of the receptive portable unit dedicated to displaying a list of user selectable attractions on its screen, wherein: said list of attractions includes multiple destinations; and (ii) attractions information for said database including attractions information is imported by the electronic system, for said database including attractions information, via a telecommunications network from another electronic system.

21. The electronic system according to claim 15, wherein: a center of said one or more centers is configured to deliver content for reception to the receptive data entry unit, wherein the content includes: a plurality of user selectable airports, wherein each airport is represented by a code utilized for air navigation; wherein said plurality of user selectable airports with each respective said code is delivered by a center of said one or more centers to display within a feature or menu of the receptive portable unit dedicated to displaying on its screen a list of airports; and wherein one or more airports included in said plurality of user selectable airports, delivered to display within said airports feature or menu, are included dependent on whether a center of said one or more centers received: from a data entry unit of said plurality of data entry units data for a flight route including said one or more airports.

* * * * *

UNITED STATES PATENT AND TRADEMARK OFFICE
CERTIFICATE OF CORRECTION

PATENT NO. : 12,300,108 B2
APPLICATION NO. : 18/387747
DATED : May 13, 2025
INVENTOR(S) : Rhett R. Dennerline Page 1 of 1

It is certified that error appears in the above-identified patent and that said Letters Patent is hereby corrected as shown below:

In the Claims

Claim 15, Column 30, Line 47, "portable unit" should read --data entry unit--.

Claim 15, Column 31, Line 9 (sixth line of limitation (f)), the one occurrence of "said" should read --the--.

Claim 18, Claim 20, and Claim 21, Column 31, Lines 54-56, 58-59, 61-62 and 65, Column 32, Lines 5, 7-8, 45, 48 and 63, each occurrence of "portable unit" should read --data entry unit--.

Claim 18, Column 31, Lines 57, 59-60 and 63, each occurrence of "portable units" should read --data entry units--.

Signed and Sealed this
Seventeenth Day of June, 2025

Coke Morgan Stewart
*Acting Director of the United States Patent and Trademark Office*